United States Patent
Yoneyama

(10) Patent No.: US 8,029,855 B2
(45) Date of Patent: Oct. 4, 2011

(54) FINE INORGANIC OXIDE DISPERSION, COATING COMPOSITION, OPTICAL FILM, ANTIREFLECTION FILM, POLARIZING PLATE AND IMAGE DISPLAY DEVICE

(75) Inventor: Hiroyuki Yoneyama, Minami-Ashigara (JP)

(73) Assignee: FUJIFILM Corporation, Minato-Ku, Tokyo (JP)

( * ) Notice: Subject to any disclaimer, the term of this patent is extended or adjusted under 35 U.S.C. 154(b) by 184 days.

(21) Appl. No.: 12/292,866

(22) Filed: Nov. 28, 2008

(65) Prior Publication Data

US 2009/0178589 A1      Jul. 16, 2009

Related U.S. Application Data

(62) Division of application No. 11/019,743, filed on Dec. 23, 2004, now abandoned.

(30) Foreign Application Priority Data

Dec. 26, 2003   (JP) .................................. 2003-434144
Mar. 25, 2004   (JP) .................................. 2004-090450

(51) Int. Cl.
   *C08K 9/04*      (2006.01)
(52) U.S. Cl. ..................... 427/220; 427/387; 427/385.5; 427/515; 523/212; 523/213; 526/242
(58) Field of Classification Search .......... 523/212, 523/213; 427/220, 387, 385.5, 515; 526/242
   See application file for complete search history.

(56) References Cited

U.S. PATENT DOCUMENTS

| | | | |
|---|---|---|---|
| 5,635,544 A * | 6/1997 | Tamura et al. ................. | 522/79 |
| 5,695,851 A | 12/1997 | Watanabe et al. | |
| 6,063,830 A | 5/2000 | Deguchi et al. | |
| 6,480,250 B1 | 11/2002 | Matsufuji et al. | |
| 6,808,808 B2 | 10/2004 | Freeman et al. | |
| 6,873,387 B2 | 3/2005 | Hokazono et al. | |
| 6,921,576 B2 | 7/2005 | Terauchi et al. | |
| 6,950,236 B2 | 9/2005 | Hokazono et al. | |
| 7,132,460 B2 | 11/2006 | Fujimoto et al. | |
| 7,138,185 B2 | 11/2006 | Obayashi et al. | |
| 7,233,378 B2 | 6/2007 | Obayashi et al. | |

FOREIGN PATENT DOCUMENTS

| | | |
|---|---|---|
| JP | 7-112126 A | 5/1995 |
| JP | 9-40909 A | 2/1997 |
| JP | 9-169847 A | 6/1997 |
| JP | 11-189621 A | 7/1999 |
| JP | 11-228631 A | 8/1999 |
| JP | 2000-313709 A | 11/2000 |
| JP | 2001-233611 A | 8/2001 |
| JP | 2003-222704 A | 8/2003 |
| JP | 2004-300172 A | 10/2004 |
| WO | WO 02/084338 | 10/2002 |

OTHER PUBLICATIONS

Office Action (Notification of Reasons for Refusal) dated Oct. 26, 2010, issued by the Japanese Patent Office in corresponding Japanese Patent Application No. 2004-340106, and English language translation thereof.

* cited by examiner

*Primary Examiner* — Margaret G Moore

(74) *Attorney, Agent, or Firm* — Buchanan Ingersoll & Rooney PC

(57) ABSTRACT

An inorganic oxide dispersion containing an organic solvent, and inorganic oxide particles surface-treated with at least one of a hydrolyzate and a partial condensate of an organosilane compound represented by formula (I), the inorganic oxide particles being dispersed in the organic solvent: $(R^{10})_m-SI(X)_{4-m}$ (I) as defined herein, the surface treatment of the inorganic oxide particles being carried out in a presence of at least one of: (a) an acid catalyst; and (b) a metal chelate compound having Zr, Ti or Al as a center metal and at least one of an alcohol represented by formula: $R^3OH$ in which $R^3$ represents an alkyl group having 1 to 10 carbon atoms, and a compound represented by formula: $R^4COCH_2COR^5$ as defined herein, as a ligand.

7 Claims, 1 Drawing Sheet

FINE INORGANIC OXIDE DISPERSION, COATING COMPOSITION, OPTICAL FILM, ANTIREFLECTION FILM, POLARIZING PLATE AND IMAGE DISPLAY DEVICE

CROSS REFERENCE TO RELATED APPLICATIONS

The present application is a divisional application of U.S. patent application Ser. No. 11/019,743, filed Dec. 23, 2004, now abandoned the entire contents of which are incorporated herein by reference, which, in turn, claims priority of Japanese Application No. 2003-434144, filed Dec. 26, 2003 and Japanese Application No. 2004-090450, filed Mar. 25, 2004.

FIELD OF THE INVENTION

This invention relates to a fine inorganic oxide dispersion having fine inorganic oxide particles dispersed stably and a coating composition containing the same. The invention further relates to an optical film, particularly an antireflection film, formed of the coating composition. The invention still further relates to an optical film, particularly a polarizing plate and an image display device having an antireflection film.

BACKGROUND OF THE INVENTION

Compounding organic or inorganic materials into adhesives, exterior coatings, hard coats, antireflection coatings, and the like has been studied to improve scratch resistance and strength after cure, adhesion to substrates, and the like.

In mixing an organic material and an inorganic material, it is necessary to prevent undesired agglomeration of the inorganic material. One of the methods generally followed is to disperse an inorganic material in a solvent compatible with an organic material and mix the dispersion and the organic material to prepare a coating composition for forming a coating film. In order to secure stable performance, it is important that the inorganic material be stably dispersed in the solvent. In other words, it is important to control the hydrophilicity/hydrophobicity or steric hindrance of the surface of the inorganic material. Surface treatment of fine inorganic oxide particles with an alkoxysilane is known. For example, *Ganryo Bunsan Gijutu Hyomenshori to Bensanzai no Tukaikata oyobi Bunsansei Hyoka*, Technical Information Institute Co., Ltd., 1999 describes a technique of dispersing inorganic particles in an organic solvent with the aid of a silane coupling agent. The technique is insufficient in terms of stability of a resultant dispersion, nevertheless.

In combining an organic material particularly of polymerization cure system and inorganic particles, use of an alkoxysilane having a polymerizable group and/or a hydrolysis-condensation product thereof has been attracting attention. For instance, JP-A-9-169847 proposes a combined use of a specific polyalkoxypolysiloxane and a polymerizable silane coupling agent. However, the reaction between the polyalkoxypolysiloxane and the polymerizable silane coupling agent hardly proceeds sufficiently for achieving a high ratio of introducing the polymerizable group so that the resulting cured product is not satisfactory in scratch resistance or strength. JP-A-9-40909 proposes use of a partial co-hydrolysis-condensation product of an alkoxysilane having an organic functional group and a tetraalkoxysilane, but the coating composition containing the same has insufficient storage stability, still leaving room for further improvement.

An optical film, particularly an antireflection film is generally disposed in front of displays, such as cathode ray tube displays (CRTs), plasma display panels (PDPs), electroluminescence displays (ELDs), and liquid crystal displays (LCDs), whereby to prevent contrast reduction or reduction of visibility due to reflection of ambient light by making use of optical interference.

Antireflection films for that application are manufactured by forming a low reflective layer with a proper thickness on a substrate and, if desired, other layers including a high reflective layer, a middle reflective layer, and a hard coat layer, between the low reflective layer and the substrate. To achieve a low reflectance, it is desirable that the low reflective layer be made of a material having as low a refractive index as possible. Disposed as an outermost layer of displays, the antireflection film is required to have high scratch resistance. To secure high scratch resistance with as small a thickness as about 100 nm, the antireflection film should exhibit strength per se and adhesion to an underlying layer.

Means for reducing a refractive index of a material include introducing fluorine and decreasing the density (by making voids), but both approaches are accompanied by reductions in film strength (scratch resistance) and adhesion. It has therefore been a difficult problem to satisfy both the requirements for low refractive index and high scratch resistance.

JP-A-11-189621, JP-A-11-228631, and JP-A-2000-313709 disclose techniques for providing a film with a reduced frictional coefficient and improved scratch resistance by introducing a polysiloxane structure into a fluoropolymer. The technique is effective to some extent in improving scratch resistance but is still insufficient for improving scratch resistance of a coating film that essentially lacks film strength and interfacial adhesion.

JP-A-2003-222704 teaches that addition of a silane coupling agent to a low refractive layer material containing a fluoropolymer provides a coating film with markedly improved scratch resistance. However, because a silane coupling agent having a low boiling point vaporizes while being applied and dried, it must be added in an excess corresponding to the evaporation loss, which makes it difficult to obtain stable performance.

SUMMARY OF THE INVENTION

An object of the present invention is to provide a stable, fine dispersion of inorganic oxide particles and a coating composition containing the same.

Another object of the invention is to provide an optical film, particularly an antireflection film, having improved scratch resistance while maintaining sufficient antireflection performance.

Still another object of the invention is to provide an optical film, particularly a polarizing plate and an image display device having an antireflection film.

As a result of extensive investigations, the present inventors have found that the above objects of the invention are accomplished by the following fine inorganic oxide dispersion, coating composition, optical film, an antireflection film, a polarizing plate and an image display device.

The present invention provides, in its first aspect, a fine inorganic oxide dispersion having dispersed in an organic solvent fine inorganic oxide particles surface-treated with a hydrolyzate and/or a partial condensate of an organosilane compound represented by formula (I):

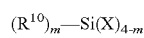

(I)

wherein $R^{10}$ represents a substituted or unsubstituted alkyl group or a substituted or unsubstituted aryl group; X represents a hydroxyl group or a hydrolyzable group; and m represents an integer of 1 to 3.

The surface treatment is carried out in the presence of (a) an acid catalyst and/or (b) a metal chelate compound having Zr, Ti or Al as a center metal and an alcohol represented by formula: $R^3OH$ (wherein $R^3$ represents an alkyl group having 1 to 10 carbon atoms) and/or a compound represented by formula: $R^4COCH_2COR^5$ (wherein $R^4$ represents an alkyl group having 1 to 10 carbon atoms; and $R^5$ represents an alkyl group having 1 to 10 carbon atoms or an alkoxy group having 1 to 10 carbon atoms) as a ligand.

The present invention also provides, in its second aspect, a process of producing a fine dispersion of inorganic oxide particles in an organic solvent, including the steps of (1) surface treating inorganic oxide particles with a hydrolyzate and/or a partial condensate of an organosilane compound represented by formula (I) shown above in an organic solvent having a small ketone solvent content in the presence of (a) an acid catalyst and/or (b) the above-described metal chelate compounds and (2) replacing the organic solvent used for the surface treatment with an organic solvent having an increased ketone solvent content.

The present invention also provides, in its third aspect, a fine inorganic oxide dispersion obtained by the above-described process.

In a preferred embodiments of the fine inorganic oxide dispersion of the invention, the inorganic oxide particles are surface treated with the hydrolyzate and/or partial condensate of the organosilane compound represented by formula (I) and a compound having a fluoroalkyl group and/or a fluorine-containing aromatic group.

The organosilane compound represented by formula (I), the compound having a fluoroalkyl group and/or a fluorine-containing aromatic group, or both of them are preferably a fluorine-containing silane coupling agent represented by formula (1):

$$(Rf-L_1)_n-Si(R^{11})_{n-4} \quad (1)$$

wherein Rf represents a straight-chain, branched or cyclic fluoroalkyl group having 1 to 20 carbon atoms or a fluorine-containing aromatic group having 6 to 14 carbon atoms; $L_1$ represents a divalent linking group having 10 or fewer carbon atoms; $R^{11}$ represents a hydroxyl group or a hydrolyzable group; and n represents an integer of 1 to 3.

The fluorine-containing silane coupling agent of formula (1) is preferably represented by formula (2):

$$C_nF_{2n+1}-(CH_2)_m-Si(R)_3 \quad (2)$$

wherein n represents an integer of 1 to 10; m represents an integer 1 to 5; and R represents an alkoxy group having 1 to 5 carbon atoms or a halogen atom.

In a preferred embodiment of the fine organic oxide dispersion of the invention, the organosilane compound of formula (I) is represented by formula (II):

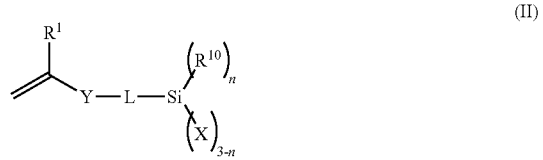

(II)

wherein $R^{10}$ and X are as defined above; $R^1$ represents a hydrogen atom, a methyl group, a methoxy group, an alkoxy-carbonyl group, a cyano group, a fluorine atom or a chlorine atom; Y represents a single bond, —COO—, —CONH— or —O—; L represents a divalent linking group; and n represents 0 or 1.

In a preferred embodiment of the fine organic oxide dispersion of the invention, the inorganic oxide particles are silica particles, particularly hollow silica particles.

The present invention also provides, in its fourth aspect, a coating composition containing the above-described fine inorganic oxide dispersion and a film-forming composition. The film forming composition contains a compound having an ethylenically unsaturated group. The compound having an ethylenically unsaturated group is preferably the main component of the film forming composition.

The present invention also provides, in its fifth aspect, an optical film having a transparent substrate and a layer of the above-described coating composition provided on the substrate.

In a preferred embodiment of the optical film, the inorganic oxide particles in the layer are hollow particles having a refractive index of 1.20 to 1.46, particularly hollow silica particles having a refractive index of 1.17 to 1.40.

The optical film includes, as a preferred embodiment, an antireflection film having an antireflection layer containing a low refractive layer on the transparent substrate, and the low refractive layer is the layer formed of the above-described coating composition.

In a preferred embodiment of the antireflection film, the inorganic oxide particles in the coating composition are hollow silica particles the average particle size of which is 30% to 150% of the thickness of the low refractive layer.

In another preferred embodiment of the antireflection film, the coating composition of the low refractive layer preferably contains a fluoropolymer represented by formula (A):

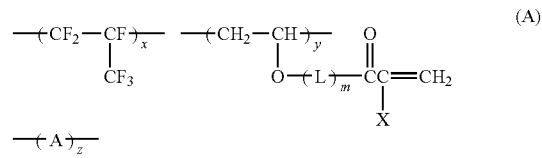

(A)

wherein L represents a linking group having 1 to 10 carbon atoms; In represents 0 or 1; X represents a hydrogen atom or a methyl group; A represents a repeating unit derived from at least one vinyl monomer; and x, y, and z represent a mole percent of the respective repeating units in ranges $30 \leq x \leq 60$, $5 \leq y \leq 70$, and $0 \leq z \leq 65$.

The present invention also provides, in its sixth aspect, a polarizing plate having a polarizing film protected with the antireflection film.

The present invention also provides, in its seventh aspect, an image display device having the antireflection film or the polarizing plate disposed as an outermost surface thereof.

The inorganic oxide dispersion according to the present invention has high dispersion stability. A coating composition containing the inorganic oxide dispersion and a film forming composition provides an optical film with no haze and high scratch resistance. The optical film of the present invention, especially a display using the antireflective film exhibit excellent visibility with little reflection of ambient light or objects on the viewer's side.

DETAILED DESCRIPTION OF THE INVENTION

Figure 1:
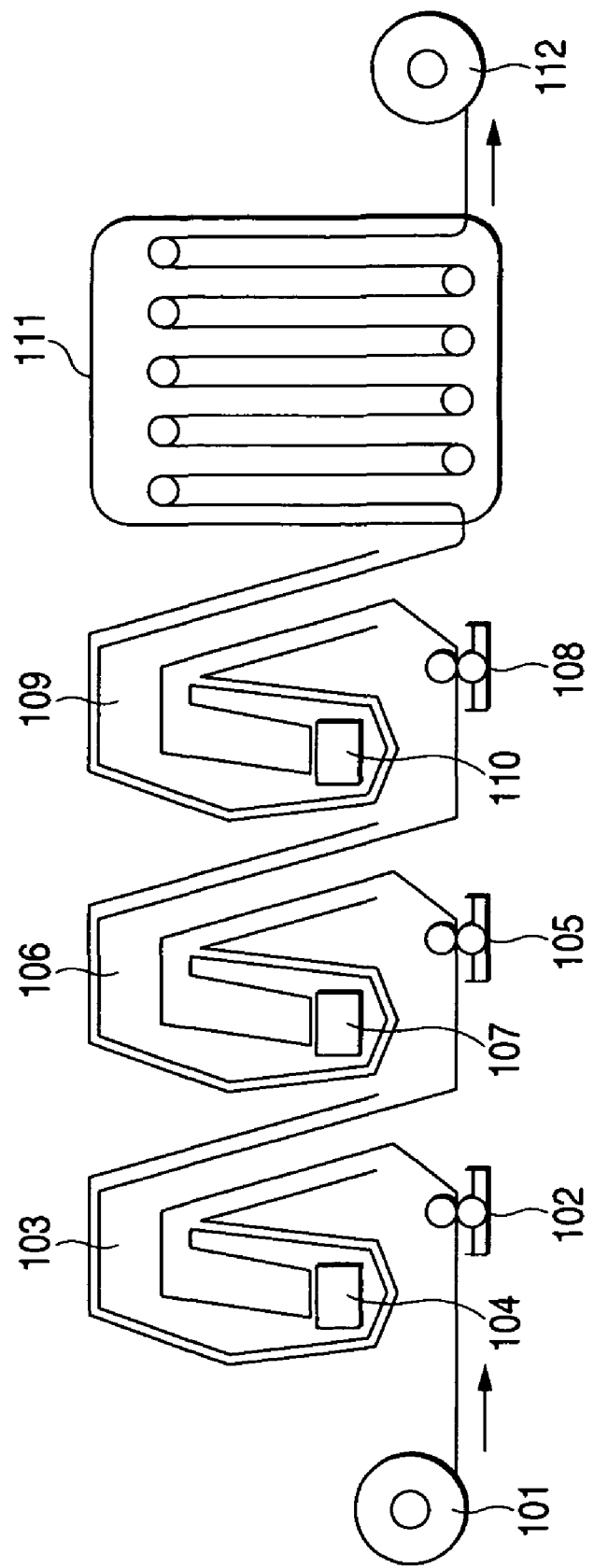
FIG. 1 schematically illustrates a coating system configuration for producing an antireflection film of the invention.

The fine inorganic oxide dispersion of the present invention has surface-treated inorganic oxide particles in an organic solvent. The inorganic oxide particles are surface treated with a hydrolyzate and/or a partial condensate of an organosilane compound represented by formula (I):

$$(R^{10})_m-Si(X)_{4-m} \qquad (I)$$

wherein $R^{10}$ represents a substituted or unsubstituted alkyl group or a substituted or unsubstituted aryl group; X represents a hydroxyl group or a hydrolyzable group; and m represents an integer of 1 to 3. The dispersion is characterized in that the surface treatment of the inorganic oxide particles is carried out in the presence of (a) an acid catalyst, (b) a metal chelate compound, or both of (a) and (b).

The surface treatment is performed by bringing the inorganic oxide particles with the organosilane compound (I) and, if necessary, water in the presence of (a) an acid catalyst having a hydrolyzing function and/or (b) a metal chelate compound having a condensing function. The organosilane compound may have previously been partially hydrolyzed or partially condensed. The organosilane compound undergoes hydrolysis followed by partial condensation, and the resultant hydrolyzate and/or partial condensate modifies the surface of the inorganic oxide particles. The particles thus surface treated exhibit improved dispersibility to provide a stable dispersion in an organic solvent.

The metal chelate compound is a compound having Zr, Ti or Al as a center metal and an alcohol represented by formula: $R^3OH$ (wherein $R^3$ represents an alkyl group having 1 to 10 carbon atoms) and/or a compound represented by formula: $R^4COCH_2COR^5$ (wherein $R^4$ represents an alkyl group having 1 to 10 carbon atoms; and $R^5$ represents an alkyl group having 1 to 10 carbon atoms or an alkoxy group having 1 to 10 carbon atoms) as a ligand.

The organosilane compound used in the invention, which is represented by formula (I), will be described in detail.

In formula (I), $R^{10}$ represents a substituted or unsubstituted alkyl group or a substituted or unsubstituted aryl group. The alkyl group preferably contains 1 to 30, still preferably 1 to 16, particularly preferably 1 to 6, carbon atoms, including methyl, ethyl, propyl, isopropyl, hexyl, t-butyl, sec-butyl, hexyl, decyl, and hexadecyl. The aryl group includes phenyl and naphthyl, with phenyl being preferred.

X represents a hydroxyl group or a hydrolyzable group. Examples of the hydrolyzable group include an alkoxy group (preferably one having 1 to 5 carbon atoms, e.g., methoxy or ethoxy), a halogen atom (e.g., Cl, Br or I), and $R^2COO$ (wherein $R^2$ represents a hydrogen atom or an alkyl group having 1 to 5 carbon atoms, e.g., $CH_3COO$ or $C_2H_5COO$). X is preferably an alkoxy group, particularly methoxy or ethoxy.

m represents an integer of 1 to 3. When there are two or more $R^{10}$s or Xs in formula (I), $R^{10}$s or Xs may be the same or different. m is preferably 1 or 2, still preferably 1.

The substituent of the substituted alkyl or aryl group as $R^{10}$ includes, but is not limited to, a halogen atom (e.g., fluorine, chlorine or bromine), a hydroxyl group, a mercapto group, a carboxyl group, an epoxy group, an alkyl group (e.g., methyl, ethyl, isopropyl, propyl or t-butyl), an aryl group (e.g., phenyl or naphthyl), an aromatic heterocyclic group (e.g., furyl, pyrazolyl or pyridyl), an alkoxy group (e.g., methoxy, ethoxy, isopropoxy or hexyloxy), an aryloxy group (e.g., phenoxy), an alkylthio group (e.g., methylthio or ethylthio), an arylthio group (e.g., phenylthio), an alkenyl group (e.g., vinyl or 1-propenyl), an acyloxy group (e.g., acetoxy, acryloyloxy or methacryloyloxy), an alkoxycarbonyl group (e.g., methoxycarbonyl or ethoxycarbonyl), an aryloxycarbonyl group (e.g., phenoxycarbonyl), a carbamoyl group (e.g., carbamoyl, N-methylcarbamoyl, N,N-dimethylcarbamoyl or N-methyl-N-octylcarbamoyl), and an acylamino group (e.g., acetylamino, benzoylamino, acrylamino or methacrylamino). These substituents may have a further substituent if possible.

When there are two or more $R^{10}$s, it is preferred that at least one of them be a substituted alkyl or aryl group. Of the organosilane compounds of formula (I), those having a vinyl polymerizable substituent which are represented by formula (II) shown below are preferred.

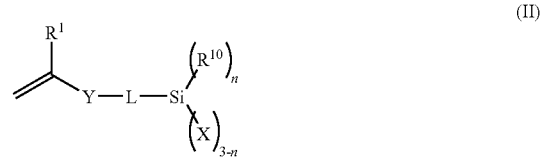

$$(II)$$

wherein $R^{10}$ and X are as defined for formula (I); $R^1$ represents a hydrogen atom, a methyl group, a methoxy group, an alkoxycarbonyl group, a cyano group, a fluorine atom or a chlorine atom; Y represents a single bond, an ester group, an amido group, an ether group or a urea group; L represents a divalent linking group; and n represents 0 or 1.

The alkoxycarbonyl group as $R^1$ includes methoxycarbonyl and ethoxycarbonyl. $R^1$ is preferably a hydrogen atom, a methyl group, a methoxy group, a methoxycarbonyl group, a cyano group, a fluorine atom or a chlorine atom, still preferably a hydrogen atom, a methyl group, a methoxycarbonyl group, a fluorine atom or a chlorine atom, particularly preferably a hydrogen atom or a methyl group.

Y is preferably a single bond, an ester group or an amido group, still preferably a single bond or an ester group, particularly preferably an ester group.

Examples of the linking group L include a substituted or unsubstituted alkylene group, a substituted or unsubstituted arylene group, a substituted or unsubstituted alkylene group having a linking group (e.g., ether, ester or amido) in the chain thereof or a substituted or unsubstituted arylene group having a linking group in the inside thereof. L is preferably a substituted or unsubstituted alkylene group having 2 to 10 carbon atoms, a substituted or unsubstituted arylene group having 6 to 20 carbon atoms or an alkylene group having 3 to 10 carbon atoms and containing a linking group in the chain thereof, still preferably an unsubstituted alkylene group, an unsubstituted arylene group or an alkylene group having an ether or ester linking group in the chain thereof, particularly preferably an unsubstituted alkylene group or an alkylene group having an ether or ester linking group in the chain thereof. The substituent of the substituted alkylene or arylene group includes a halogen atom, a hydroxyl group, a mercapto group, a carboxyl group, an epoxy group, an alkyl group, and an aryl group. These substituents may have a further substituent if possible.

$R^{10}$ is preferably a substituted or unsubstituted alkyl group or a substituted or unsubstituted aryl group, still preferably an unsubstituted alkyl group or an unsubstituted aryl group.

X is preferably a halogen atom, a hydroxyl group or an unsubstituted alkoxy group, still preferably a chlorine atom, a hydroxyl group or an unsubstituted alkoxy group having 1 to 6 carbon atoms, particularly preferably a hydroxyl group or an alkoxy group having 1 to 3 carbon atoms. A methoxy group is the most preferred. The two or three Xs may be the same or different. n is preferably 0.

The organosilane compounds of formula (I) can be used either individually or as a combination of two or more thereof. Specific but non-limiting examples of the compounds represented by formula (I) and (II) are shown below.

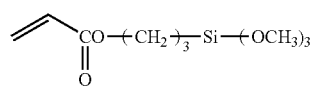
M-1

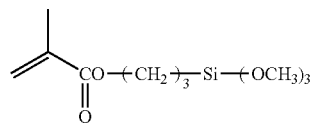
M-2

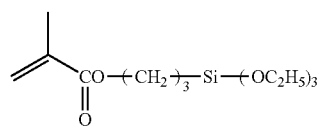
M-3

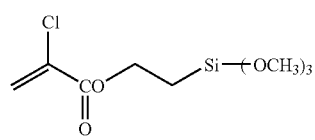
M-4

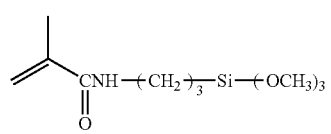
M-5

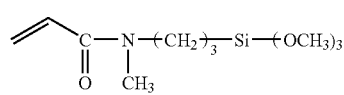
M-6

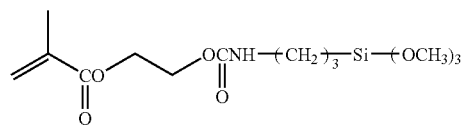
M-7

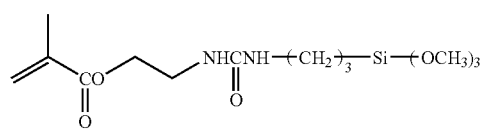
M-8

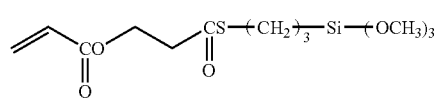
M-9

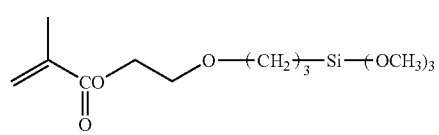
M-10

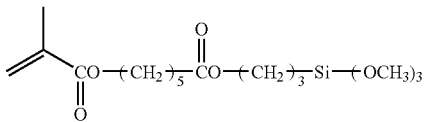
M-11

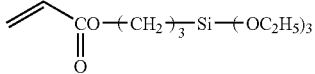
M-12

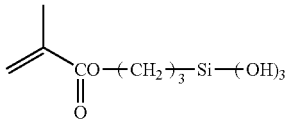
M-13

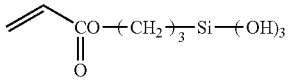
M-14

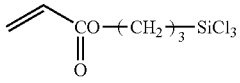
M-15

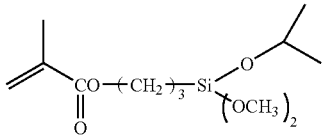
M-16

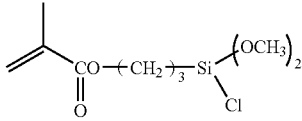
M-17

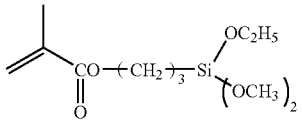
M-18

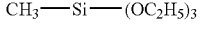
M-19

M-20

M-21

M-22

M-23

M-24

M-25

M-26

M-27

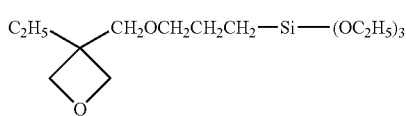

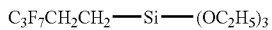

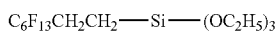

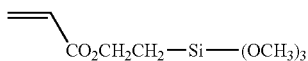

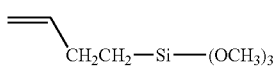

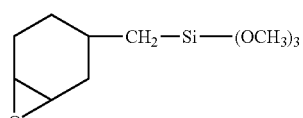

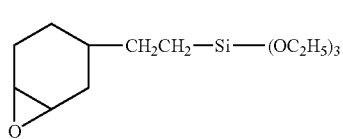

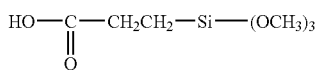

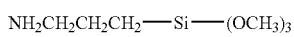

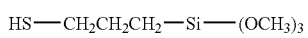

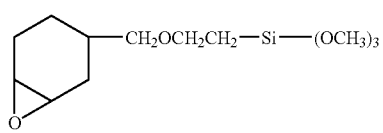

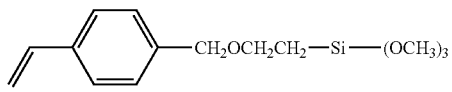

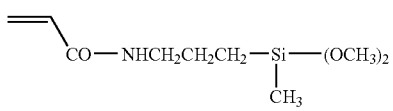

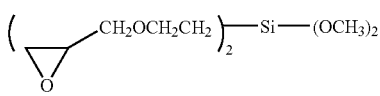

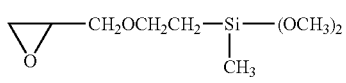

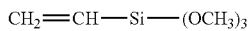

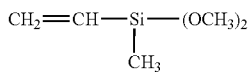

M-28
M-29
M-30
M-31
M-32
M-33
M-34
M-35
M-36
M-37
M-38
M-39
M-40
M-41
M-42
M-43
M-44
M-45
M-46

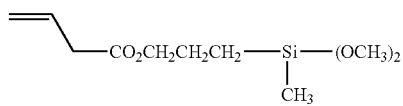

M-47

Particularly preferred of the compounds listed above are M-1 (acryloyloxypropyltrimethoxysilane), M-2 (methacryloyloxypropyltrimethoxysilane), and M-25 (glycidoxypropyltrimethoxysilane).

The amount of the organosilane compound (I) to be used in the invention is not critical but is preferably 1% to 300% by weight, still preferably 2% to 100% by weight, particularly preferably 5% to 50% by weight, based on the inorganic oxide particles to be surface treated; or preferably 1 to 300 mol %, still preferably 5 to 300 mol %, particularly preferably 10 to 200 mol %, based on the hydroxyl group content on the surface of the inorganic oxide particles. With the amount of the organosilane compound (I) falling within the above ranges, there is produced a sufficient stabilizing effect on the inorganic oxide dispersion, and the dispersion will form a high strength coating film.

It is preferred that the inorganic oxide particles be surface-modified with not only the organosilane compound hydrolyzate and/or partial condensate but also a compound having a fluoroalkyl group or a fluorine-containing aromatic group. It is preferred that the inorganic oxide particles and the compound having a fluoroalkyl group or a fluorine-containing aromatic group react with each other. It is still preferred that the surface of the inorganic oxide particles be chemically treated with a fluorine-containing surface active agent, a fluorine-containing coupling agent, and the like. It is particularly preferred that the surface of the inorganic oxide particles be chemically treated with a fluorine-containing coupling agent. The fluorine-containing coupling agent preferably includes alkoxymetal compounds, such as titan coupling agents and silane coupling agents, particularly fluorine-containing silane coupling agents. A fluorine-containing silane coupling agent represented by formula (1) shown below is especially effective.

$$(Rf-L_1)_n-Si(R^{11})_{n-4} \quad (1)$$

wherein Rf represents a straight-chain, branched or cyclic fluoroalkyl group having 1 to 20 carbon atoms or a fluorine-containing aromatic group having 6 to 14 carbon atoms; $L_1$ represents a divalent linking group having 10 or fewer carbon atoms; $R^{11}$ represents a hydroxyl group or a hydrolyzable group; and n represents an integer of 1 to 3.

The surface treatment with a fluorine-containing silane coupling agent is preferably such that a partial condensate is formed between a component derived from the fluorine-containing silane coupling agent and the inorganic oxide particles. The surface treatment with a fluorine-containing silane coupling agent brings about improved stability of the fine inorganic oxide particles in the dispersion and improved dispersibility of the particles in a coating film. A combined use of the organosilane compound represented by formula (II) and the fluorine-containing silane coupling agent represented by formula (1) is particularly effective in improving particle dispersibility in a coating film and scratch resistance of a coating film.

Since the fluorine-containing silane coupling agent of formula (1) is included in the organosilane compound of formula (I), surface treatment with the fluorine-containing organosilane compound of formula (I) alone is effective as well.

In formula (1), Rf preferably represents a straight-chain, branched or cyclic fluoroalkyl group having 3 to 10 carbon atoms, still preferably a straight-chain fluoroalkyl group having 4 to 8 carbon atoms. $L_1$ preferably represents a straight-chain or branched and substituted or unsubstituted alkylene group having 1 to 10 carbon atoms, still preferably 1 to 5 carbon atoms, that may contain a linking group (e.g., ether, ester or amido) in the chain thereof. Preferred substituents of the substituted alkylene group include a halogen atom, a hydroxyl group, a mercapto group, a carboxyl group, an epoxy group, an alkyl group, and an aryl group. $R^{11}$ is preferably an alkoxy group having 1 to 5 carbon atoms or a halogen atom, still preferably a methoxy group, an ethoxy group or a chlorine atom.

Of the fluorine-containing silane coupling agents of formula (1), preferred are those represented by formula (2):

$$C_nF_{2n+1}-(CH_2)_m-Si(R)_3 \quad (2)$$

wherein n represents an integer of 1 to 10; m represents an integer 1 to 5; and R represents an alkoxy group having 1 to 5 carbon atoms or a halogen atom.

In formula (2), n is preferably 4 to 10; m is preferably 1 to 3; and R is preferably a methoxy group, an ethoxy group or a chlorine atom.

Specific but non-limiting examples of the fluorine-containing silane coupling agents represented by formula (1), preferably formula (2), are shown below.

| | |
|---|---|
| $C_6F_{13}CH_2CH_2Si(OCH_3)_3$ | A-1 |
| $C_4F_9CH_2CH_2Si(OCH_3)_3$ | A-2 |
| $C_8F_{17}CH_2CH_2Si(OCH_3)_3$ | A-3 |
| $C_6F_{13}CH_2CH_2Si(OC_2H_5)_3$ | A-4 |
| $C_8F_{17}CH_2CH_2Si(OC_2H_5)_3$ | A-5 |
| $C_4F_9CH_2CH_2Si(OC_2H_5)_3$ | A-6 |
| $C_6F_{13}CH_2CH_2SiCl_3$ | A-7 |
| $C_8F_{17}CH_2CH_2SiCl_3$ | A-8 |
| $C_4F_9CH_2CH_2SiCl_3$ | A-9 |
| $C_6F_{13}CH_2CH_2Si(OCH_3)_2CH_3$ | A-10 |
| $C_6F_{13}CH_2CH_2CH_2Si(OCH_3)_3$ | A-11 |
| $C_4F_9CH_2CH_2CH_2Si(OCH_3)_3$ | A-12 |
| $C_8F_{17}CH_2CH_2CH_2CH_2Si(OCH_3)_3$ | A-13 |
| $C_6F_{13}CH_2Si(OC_2H_5)_3$ | A-14 |
| $C_8F_{17}CH_2CH_2Si(OC_4H_9)_3$ | A-15 |
| $C_4F_9CH_2CH_2CH_2Si(OCH_3)_3$ | A-16 |
| $C_6F_{13}CH_2CH_2Si(OCH_3)_2Br$ | A-17 |
| $C_8F_{17}CH_2CH_2CH_2Si(OCH_3)_2Cl$ | A-18 |
| $C_4F_9CH_2CH_2Si(CH_3)_2OCH_3$ | A-19 |
| $C_6F_{13}CH_2CH_2Si(OCH_3)Cl_2$ | A-20 |
| $(CF_3)_2CFCF_2CF_2CH_2CH_2Si(OCH_3)_3$ | A-21 |
| $(C_4F_9)_2CFCH_2CH_2Si(OCH_3)_3$ | A-22 |
| $(C_6F_{13})_2CFCH_2CH_2Si(OCH_3)_3$ | A-23 |
| $(CF_3)_3CCF_2CH_2CH_2Si(OCH_3)_3$ | A-24 |
| $(C_4F_9)_3CCH_2CH_2Si(OCH_3)_3$ | A-25 |
| $(CF_3)_2CFOCH_2CH_2CH_2Si(OC_2H_5)_3$ | A-26 |
| $(CF_3)_2CFOCH_2CH_2CH_2SiCl_3$ | A-27 |

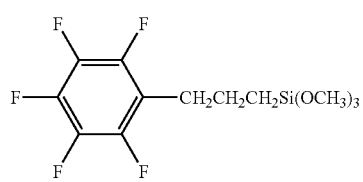

A-28

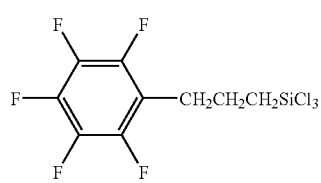

A-29

A-30

| | |
|---|---|
| $H(CF_2)_6CH_2Si(OCH_3)_3$ | A-31 |
| $H(CF_2)_4CH_2Si(OCH_3)_3$ | A-32 |
| $H(CF_2)_8CH_2Si(OCH_3)_3$ | A-33 |
| $(CH_3O)_3SiCH_2CH_2(CF_2)_6CH_2CH_2Si(OCH_3)_3$ | A-34 |
| $(CH_3O)_3SiCH_2CH_2(CF_2)_4CH_2CH_2Si(OCH_3)_3$ | A-35 |
| $(CH_3O)SiCH_2CH_2(CF_2)_8CH_2CH_2Si(OCH_3)_3$ | A-36 |
| $(C_2H_5O)_3SiCH_2CH_2(CF_2)_6CH_2CH_2Si(OC_2H_5)_3$ | A-37 |
| $(C_2H_5O)_3SiCH_2CH_2(CF_2)_4CH_2CH_2Si(OCH_3)_3$ | A-38 |
| $Cl_3SiCH_2CH_2(CF_2)_6CH_2CH_2SiCl_3$ | A-39 |
| $(CH_3O)_2CH_3SiCH_2CH_2(CF_2)_6CH_2CH_2Si(OCH_3)_2CH_3$ | A-40 |

These fluorine-containing silane coupling agents can be synthesized by, for example, the process taught in JP-A-11-189599.

The fluorine-containing silane coupling agents of formula (1) can be used either individually or as a combination of two or more thereof. The fluorine-containing silane coupling agents of formula (1) are preferably used in a total amount of 1% by 100% by weight, still preferably 2% to 80% by weight, particularly preferably 5% to 50% by weight, based on the inorganic oxide particles.

Where the organosilane compound of formula (II) is used in combination with the fluorine-containing silane coupling agent of formula (1), a preferred weight ratio of the fluorine-containing silane coupling agent (1) to the organosilane compound (II) is 99:1 to 1:99, still preferably 75:25 to 5:95, particularly preferably 50:50 to 25:75.

Where two or more organosilane compounds, including the fluorine-containing silane coupling agents, are used in the invention, they may be added all at once, or one or some of them are added in the beginning of the surface treatment, and the rest of them are added after a certain progress of the surface treating reaction. It is also preferred that the organosilane compound is previously subjected to partial condensation before being brought into contact with the inorganic oxide particles.

The above-described organosilane compound is made to act on the surface of inorganic oxide particles to make the particles more dispersible. More specifically, a component derived from the silane coupling agent is bonded to the surface of inorganic oxide particles through hydrolysis and/or condensation reaction of the organosilane compound.

The surface treatment of inorganic oxide particles with a hydrolyzate and/or a partial condensate of the organosilane compound can be effected with or without a solvent. In using a solvent, the concentration of the organosilane compound hydrolyzate and/or partial condensate is appropriately decided. An organic solvent is preferred for uniformly mixing the components. Suitable organic solvents include alcohols, aromatic hydrocarbons, ethers, ketones, and esters.

The solvent is preferably one capable of dissolving the organosilane compound hydrolyzate and/or partial condensate and the catalyst. It is preferred that the organic solvent used for the surface treatment also serve as at least part of the medium of a coating composition containing the inorganic oxide dispersion of the invention. The solvent is preferably not to impair the solubility or dispersibility of other components incorporated into the coating composition, such as a fluoropolymer hereinafter described.

Useful alcohol solvents include monohydric alcohols (preferably saturated aliphatic alcohols having 1 to 8 carbon atoms) and dihydric alcohol, such as methanol, ethanol, n-propyl alcohol, isopropyl alcohol, n-butyl alcohol, sec-butyl alcohol, tert-butyl alcohol, ethylene glycol, diethylene glycol, triethylene glycol, ethylene glycol monobutyl ether, and ethylene glycol monoethyl ether acetate.

Useful hydrocarbon solvents include benzene, toluene, and xylene. Useful ether solvents include tetrahydrofuran and dioxane. Useful ketone solvents include acetone, methyl ethyl ketone, methyl isobutyl ketone, and diisobutyl ketone. Useful ester solvents include ethyl acetate, propyl acetate, butyl acetate, and propylene carbonate.

These organic solvents can be used either individually or as a combination of two or more thereof. The concentration of the organosilane compound in the solvent used for the surface treatment is not particularly limited but usually ranges from 0.1% to 70% by weight, preferably 1% to 50% by weight.

In a preferred embodiment of the present invention, fine inorganic oxide particles are dispersed in an alcohol solvent and surface treated as described above, followed by replacement of the dispersing medium (i.e., the alcohol solvent) with an aromatic hydrocarbon solvent or a ketone solvent. For securing compatibility with a binder that is used for coating and dispersion stability, a ketone solvent is preferable to an aromatic hydrocarbon one. It is desirable for the organic solvent used in the surface treatment of the inorganic oxide particles to have a small ketone solvent content. Specifically, the content of a ketone solvent in the total solvent for the surface treatment is preferably not higher than 30% by volume, still preferably 10% by volume or lower, particularly preferably 5% by volume or lower. After the surface treatment, the ketone solvent content in the total solvent is preferably increased to 50% by volume or higher, still preferably 80% by volume or higher, particularly preferably 90% by volume or higher, by solvent replacement.

The surface treatment of inorganic oxide particles with the organosilane compound hydrolyzate and/or condensate is preferably carried out in the presence of a catalyst. Suitable catalysts include inorganic acids, such as hydrochloric acid, sulfuric acid, and nitric acid; organic acids, such as oxalic acid, acetic acid, formic acid, methanesulfonic acid, and toluenesulfonic acid; inorganic bases, such as sodium hydroxide, potassium hydroxide, and ammonia; organic bases, such as triethylamine and pyridine; and metal alkoxides, such as aluminum triisopropoxide and zirconium tetrabutoxide. From the viewpoint of production stability and storage stability of the inorganic oxide dispersion, an acid catalyst (including organic ones and inorganic ones) and/or a metal chelate compound is/are used in the present invention. Hydrochloric acid, sulfuric acid, and organic acids having a dissociation constant (pKa; in water at 25° C., hereinafter the same) of 4.5 or smaller are preferably used as an acid catalyst. Hydrochloric acid, sulfuric acid, and organic acids having a pKa of 3.0 or smaller are still preferred. Hydrochloric acid, sulfuric acid, and organic acids having a pKa of 2.5 or smaller are particularly preferred. Organic acids having a pKa of 2.5 or smaller are especially preferred. Methanesulfonic acid, oxalic acid, phthalic acid, and malonic acid are desirable. Oxalic acid is the most preferred.

Where the organosilane compound has an alkoxy group as a hydrolyzable group, and an organic acid is used as an acid catalyst, because the carboxyl group or sulfo group of the organic acid supplies a proton, the surface treatment can be accomplished with a reduced amount of water. Specifically, the requisite amount of water will be 0 to 2 mol, preferably 0 to 1.5 mol, still preferably 0 to 1 mol, particularly preferably 0 to 0.5 mol, per mole of the alkoxide group of the organosilane compound. Where an alcohol solvent is used as a medium for the surface treatment, the surface treatment could be achieved in a substantially water-free system.

The amount of the inorganic acid catalyst to be used ranges from 0.01 to 10 mol %, preferably 0.1 to 5 mol %, based on the hydrolyzable group content. In the case of the organic acid catalyst, the optimal amount to be used varies depending on the amount of water added. Where water is added, the amount of the organic acid to be used is 0.01 to 10 mol %, preferably 0.1 to 5 mol %, based on the hydrolyzable group content. When substantially no water is added, the amount of the organic acid is 1 to 500 mol %, preferably 10 to 200 mol %, still preferably 20 to 200 mol %, particularly preferably 50 to 150 mol %, especially preferably 50 to 120 mol %, based on the hydrolyzable group content.

The surface treatment is usually conducted by stirring the reaction system at 15° to 100° C. It is advisable to select the reaction temperature according to the reactivity of the organosilane compound.

The metal chelate compounds that can be used in the invention have Zr, Ti or Al as a center metal and an alcohol represented by formula: $R^3OH$ (wherein $R^3$ represents an alkyl group having 1 to 10 carbon atoms) and/or a compound represented by formula: $R^4COCH_2COR^5$ (wherein $R^4$ represents an alkyl group having 1 to 10 carbon atoms; and $R^5$ represents an alkyl group having 1 to 10 carbon atoms or an alkoxy group having 1 to 10 carbon atoms) as a ligand. These metal chelate compounds serve to accelerate condensation reaction of the organosilane compound. Preferred of these metal chelate compounds are those represented by formulae:

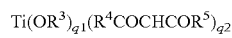

wherein $R^3$, $R^4$, and $R^5$ are as defined above; and p1, p2, q1, q2, r1, and r2 each represent an integer for forming a bi-, tetra- or hexadentate complex around the respective center metal.

In each of the formulae representing the metal chelate compounds, $R^3$ and $R^4$ may be the same or different and include ethyl, n-propyl, isopropyl, n-butyl, sec-butyl, t-butyl, and n-pentyl. Examples of $R^5$ include the above-enumerated alkyl groups and, in addition, methoxy, ethoxy, n-propoxy, isopropoxy, n-butoxy, sec-butoxy, and t-butoxy.

Specific examples of the metal chelate compounds include zirconium chelate compounds, such as tri(n-butoxy)(ethyl acetoacetato)zirconium, di(n-butoxy)bis(ethyl acetoacetato) zirconium, n-butoxytris(ethyl acetoacetato)zirconium, tetrakis(n-propyl acetoacetato)zirconium, tetrakis(acetyl acetoacetato)zirconium, and tetrakis(ethyl acetoacetate)zirconium; titanium chelate compounds, such as di(isopropoxy) bis(ethyl acetoacetato)titanium, di(isopropoxy)bis(acetyl acetato)titanium, and di(isopropoxy)bis(acetylacetone)titanium; and aluminum chelate compounds, such as di(isopropoxy)(ethyl acetoacetato)aluminum, di(isopropoxy)(acetyl acetonato)aluminum, isopropoxybis(ethyl acetoacetato)aluminum, isopropoxybis(acetyl acetonato)aluminum, tris(ethyl acetoacetato)aluminum, tris(acetyl acetonato)aluminum, and mono(acetyl acetonato)bis(ethyl acetoacetato)aluminum.

Preferred of them are tri(n-butoxy)(ethyl acetoacetato)zirconium, di(isopropoxy)bis(acetyl acetonato)titanium, di(isopropoxy)(ethyl acetoacetato)aluminum, and tris(ethyl acetoacetato)aluminum. These metal chelate compounds can be used either individually or as a combination of two or more thereof. Partial hydrolysis products of the metal chelate compounds are useful as well.

From the standpoint of condensation reaction rate and film strength, the metal chelate compound is preferably used in an amount of 0.01% to 50% by weight, still preferably 0.1% to 50% by weight, particularly preferably 0.5% to 10% by weight, based on the organosilane compound.

The dispersion or the coating composition of the present invention preferably contains (c) a β-diketone compound and/or a β-keto ester compound both represented by formula: $R^4COCH_2COR^5$ (wherein $R^4$ and $R^5$ are as defined above) (hereinafter sometimes referred to as "component (c)") in addition to the organosilane compound and (a) the acid catalyst and/or (b) the metal chelate compound. Component (c) acts as a stability improver in the dispersion or the coating composition. The β-diketone compound and/or β-keto ester compound coordinates to the center metal of the metal chelate compound (i.e., the zirconium, titanium and/or aluminum compound). It is considered to follow that the accelerating action of the metal chelate compound on the condensation reaction of the organosilane compound is suppressed thereby to provide the resulting dispersion or coating composition with improved storage stability.

Examples of the β-diketone compound and/or β-keto ester compound as component (c) include acetylacetone, methyl acetoacetate, ethyl acetoacetate, n-propyl acetoacetate, isopropyl acetoacetate, n-butyl acetoacetate, sec-butyl acetoacetate, t-butyl acetoacetate, 2,4-hexanedione, 2,4-heptanedione, 3,5-heptanedione, 2,4-octanedione, 2,4-nonanedione, and 5-methylhexanedione. Ethyl acetoacetate and acetylacetone are preferred of them, with acetylacetone being still preferred. These β-diketone compounds and β-keto ester compounds can be used either individually or as a mixture of two or more thereof. Component (c) is preferably used in an amount of 2 mol or more, still preferably 3 to 20 mol, per mole of the metal chelate compound. Addition of less than 2 mol is substantially ineffective.

The inorganic oxide particles to be surface treated in the invention preferably include particles of an oxide of at least one element selected from the group consisting of silicon, aluminum, zirconium, titanium, zinc, germanium, indium, tin, antimony, and cerium.

Examples of the oxide are silica, alumina, zirconia, titanium oxide, zinc oxide, germanium oxide, indium oxide, tin oxide, indium-tin oxide (ITO), antimony oxide, and cerium oxide. Silica, alumina, zirconia, and antimony oxide are preferred from their high hardness. These inorganic oxides can be used either individually or as a mixture thereof. The fine inorganic oxide dispersion of the present invention is obtained by dispersing the aforementioned surface-treated fine inorganic oxide particles in an organic solvent. The inorganic oxide particles are preferably surface treated in the form of a dispersion in a dispersion medium. The dispersing medium is preferably an organic solvent in view of compatibility with other components or dispersing capabilities. Suitable organic solvents as a dispersing medium include alcohols, such as methanol, ethanol, isopropyl alcohol, butanol, and octanol; ketones, such as acetone, methyl ethyl ketone, methyl isobutyl ketone, and cyclohexanone; esters, such as ethyl acetate, butyl acetate, ethyl lactate, γ-butyrolactone, propylene glycol monomethyl ether acetate, and propylene glycol monoethyl ether acetate; ethers, such as ethylene glycol monomethyl ether and diethylene glycol monobutyl ether; aromatic hydrocarbons, such as benzene, toluene, and xylene; and amides, such as dimethylformamide, dimethylacetamide, and N-methylpyrrolidone. Preferred of them are methanol, isopropyl alcohol, butanol, methyl ethyl ketone, methyl isobutyl ketone, ethyl acetate, butyl acetate, toluene, and xylene.

The inorganic oxide particles preferably have a number average particle size of 1 to 2000 nm, still preferably 3 to 200 nm, particularly preferably 5 to 100 nm. With the number average particle size exceeding 2000 nm, the coating composition tends to provide a cured product with reduced transparency or a coating film with poor surface conditions. The dispersion or the coating composition may contain various surface active agents or amine compounds for the purpose of improving the dispersibility of the particles.

Commercial products of silicon oxide (e.g., silica) particles that can be used in the invention include those supplied in colloidal form, such as Methanol Silica Sol, MA-ST-MS, IPA-St, IPA-ST-MS, IPA-ST-L, IPA-ST-ZL, IPA-ST-UP, EG-ST, NPC-ST-30, MEK-ST, MEK-ST-L, MIBK-ST, NBA-ST, XBA-ST, DMAC-ST, ST-UP, ST-OUP, ST-20, ST-40, ST-C, ST-N, ST-O, ST-50, and ST-OL, all available from Nissan Chemical Industries, Ltd., and hollow silica CS60-IPA available from Catalysts & Chemicals Industries Co., Ltd.; and those supplied in powder form, such as Aerosil 130, Aerosil 300, Aerosil 380, Aerosil TT600, and Aerosil OX50, all available from Nippon Aerosil Co., Ltd., Sildex H31, H32, H51, H52, H121, and H122 available from Asahi Glass Co., Ltd., E220A and E220 available from Nippon Silica Kogyo KK, Sylysia 470 available from Fuji Silysia Chemical Ltd., and SG Flake available from Nippon Sheet Glass Co., Ltd.

Commercial products of other inorganic oxide particles that can be used in the invention include waterborne dispersions of alumina, such as Alumina Sol 100, 200 and 520 from Nissan Chemical Industries, Ltd.; 2-propanol dispersions of alumina, such as AS-150I from Sumitomo Osaka Cement Co., Ltd.; toluene dispersions of alumina, such as AS-150T from Sumitomo Osaka Cement; toluene dispersions of zirconia, such as HXU-110JC from Sumitomo Osaka Cement; waterborne dispersions of zinc antimonate, such as Celnax from Nissan Chemical; alumina, titanium oxide, tin oxide, indium oxide or zinc oxide powders or solventborne dispersions exemplified by NanoTek series from C.I. Kasei Co., Ltd.; waterborne dispersions of antimony-doped tin oxide, such as SN-100D from Ishihara Sangyo Kaisha, Ltd.; ITO powders available from Mitsubishi Materials Corp.; and waterborne dispersions of cerium oxide, such as Needral from Taki Chemical Co., Ltd.

The inorganic oxide particles may be amorphous or may have a spherical shape, a rod shape, a plate shape or a fibrous shape and may be solid or hollow and porous or nonporous. The oxide particles are preferably spherical and/or hollow. Hollow silica particles will be described later. The oxide particles preferably have a BET specific surface area (measured using nitrogen as adsorption gas) of 10 to 1000 m²/g, still preferably 100 to 500 m²/g. The dispersion of the inorganic oxide particles to be surface treated may be prepared by dispersing an inorganic oxide powder in an organic solvent, or any of the above-recited fine dispersions known in the art may be utilized as such.

In case where an inorganic oxide powder is dispersed in a dispersing medium, a dispersant can be used. A dispersant having an anionic group is preferred. Effective anionic groups include those having an acidic proton, such as a carboxyl group, a sulfo group, a phosphono group, and a sulfonamido group, and their salt forms. A carboxyl group, a sulfo group, a phosphono group, and their salt forms are preferred. A carboxyl group and a phosphono group are still preferred. A dispersant can have two or more anionic groups for ensuring the effect of improving the dispersibility. The average number of the anionic groups per molecule is preferably 2 or greater, still preferably 5 or greater, particularly preferably 10 or greater. The anionic groups present per molecule may be the same or different.

The dispersant can contain a crosslinkable or polymerizable functional group in its molecule. A crosslinkable or polymerizable functional group includes ethylenically unsaturated groups capable of addition reaction and polymerization reaction initiated by a radical species (e.g., (meth)acryloyl, allyl, styryl or vinyloxy), cationically polymerizable groups (e.g., epoxy, oxatanyl or vinyloxy), and polycondensation reactive groups (e.g., hydrolyzable silyl groups and N-methylol). Functional groups having an ethylenically unsaturated group are preferred.

A dispersing machine can be used to pulverize inorganic oxide particles. Useful dispersing machines include a sand grinder mill (e.g., a bead mill with pins), a high-speed impeller mill, a pebble mill, a roller mill, an attritor, and a colloid mill. A sand grinder mill and a high-speed impeller mill are recommended. The oxide particles may previously be dispersed by means of a ball mill, a three-roll mill, a kneader, an extruder, etc.

The above-described organic solvent dispersion of surface-treated inorganic oxide particles can be compounded with a film-forming composition to make a coating composition. The coating composition containing the inorganic oxide dispersion forms a layer of an optical film. The coating composition is particularly suitable to form a low refractive layer of an antireflection film.

The optical film according to the present invention has a transparent substrate (hereinafter sometimes referred to as a base film) and one or more functional layers provided thereon. At least one of the functional layers is formed of the coating composition of the invention.

The functional layers of an optical film as referred to here include an antistatic layer, a hard coat layer, an antireflection layer, an antiglare layer, an optical compensation layer, an orientation layer, and a liquid crystal layer. The antireflection film according to the present invention has an antireflection layer provided on a transparent substrate and, if necessary, a hard coat layer provided between the substrate and the antireflection layer. The antireflection layer is composed of at least one layer, usually a stack of layers, of which the refractive index, the thickness, the number, and the order of stacking are designed so as to reduce the reflectance by optical interference.

The simplest layer structure of the antireflection film is a substrate having formed thereon an antireflection layer composed solely of a low refractive layer. To further reduce the reflectance, the antireflection layer is desirably composed of at least one high refractive layer having a higher refractive index than the substrate and at least one low refractive layer having a lower refractive index than the substrate. Known antireflection films have a two-layer structure having a high refractive layer and a low refractive layer stacked on a substrate in that order or a three-layer structure having a middle refractive layer, a high refractive layer, and a low refractive layer stacked on a substrate in that order (the middle refractive layer having a higher refractive index than the substrate or a hard coat layer and a lower refractive index than the high refractive layer). Layer structures with more layers are also proposed. An antireflection film having, on a substrate, a hard coat layer, a middle refractive layer, a high refractive layer, and a low refractive layer in that order is particularly preferred for its durability, optical characteristics, cost, and productivity. The antireflection film of the invention may further have an antiglare layer, an antistatic layer, and the like.

The structures the antireflection film of the invention can have are listed below.
1) Base film/low refractive layer
2) Base film/antiglare layer/low refractive layer
3) Base film/hard coat layer/antiglare layer/low refractive layer
4) Base film/hard coat layer/high refractive layer/low refractive layer
5) Base film/hard coat layer/middle refractive layer/high refractive layer/low refractive layer
6) Base film/antiglare layer/high refractive layer/low refractive layer
7) Base film/antiglare layer/middle refractive layer/high refractive layer/low refractive layer
8) Base film/antistatic layer/hard coat layer/middle refractive layer/high refractive layer/low refractive layer
9) Antistatic layer/base film/hard coat layer/middle refractive layer/high refractive layer/low refractive layer
10) Base film/antistatic layer/antiglare layer/middle refractive layer/high refractive layer/low refractive layer
11) Antistatic layer/base film/antiglare layer/middle refractive layer/high refractive layer/low refractive layer
12) Antistatic layer/base film/antiglare layer/high refractive layer/low refractive layer/high refractive layer/low refractive layer The layer structure of the antireflection film of the invention is not limited to the above list as long as it reduces the reflectance through optical interference. The high refractive layer may be a light scattering layer having no antiglare performance. The antistatic layer is preferably a layer containing conductive polymer particles or metal oxide fine particles (e.g., $SnO_2$, ITO), which can be formed by application of a coating composition or plasma treatment under atmospheric pressure.

The film-forming composition making up the coating composition according to the present invention preferably contains a compound having an ethylenically unsaturated group. Such a compound is preferably a main film-forming binder of the film forming composition from the viewpoint of film strength, stability of the coating composition, and productivity of the coating film. The term "main film forming binder" as used herein means a binder component forming a proportion of at least 10% by weight in total film forming components other than the inorganic particles. The proportion of the main film forming binder in the total film forming components is preferably 20% to 100% by weight, still preferably 30% to 95% by weight.

The film forming binder is preferably a polymer having a saturated hydrocarbon chain or a polyether chain as a main chain, still preferably a polymer having a saturated hydrocarbon chain as a main chain. A homo- or copolymer of a monomer having two or more ethylenically unsaturated groups per molecule is a preferred binder polymer having a saturated hydrocarbon chain as a main chain and a crosslinked structure. To increase the refractive index, the monomer preferably contains an aromatic ring or at least one atom selected from halogen atoms other than fluorine, a sulfur atom, a phosphorus atom, and a nitrogen atom in its structure.

Examples of the monomer having two or more ethylenically unsaturated groups include esters between polyhydric alcohols and (meth)acrylic acid, such as ethylene glycol di(meth)acrylate, 1,4-cyclohexane diacrylate, pentaerythritol tetra(meth)acrylate, pentaerythritol tri(meth)acrylate, trimethylolpropane tri(meth)acrylate, trimethylolethane tri(meth)acrylate, dipentaerythritol tetra(meth)acrylate, dipentaerythritol penta(meth)acrylate, dipentaerythritol hexa(meth)acrylate, pentaerythritol hexa(meth)acrylate, 1,2,3- cyclohexane tetramethacrylate, polyurethane polyacrylate, and polyester polyacrylate; vinylbenzene and derivatives thereof, such as 1,4-divinylbenzene, 2-acryloylethyl 4-vinylbenzoate, and 1,4-divinylcyclohexanone; vinylsulfones, such as divinylsulfone; acrylamides, such as methylenebisacrylamide; and methacrylamides. The terms "(meth)acrylic" and "(meth)acrylate" as used herein mean "acrylic or methacrylic" and "acrylate or methacrylate", respectively. These monomers can be used either individually or as a combination of two or more thereof.

Examples of monomers providing high refractive polymers include bis(4-methacryloylthiophenyl) sulfide, vinylnaphthalene, vinyl phenyl sulfide, and 4-methacryloxyphenyl-4'-methoxyphenyl thioether. These monomers are also employable either individually or as a combination of two or more thereof.

Polymerization of the monomer having an ethylenically unsaturated group can be carried out by irradiation with an ionizing radiation or heating in the presence of a photo radical initiator or a thermal radical initiator.

Useful photo radical initiators include acetophenones, benzoins, benzophenones, phosphine oxides, ketals, anthraquinones, thioxanthones, azo compounds, peroxides, 2,3-dialkyldione compounds, disulfide compounds, fluoroamine compounds, and aromatic sulfoniums. Examples of the acetophenones are 2,2-diethoxyacetophenone, p-dimethylacetophenone, 1-hydroxydimethyl phenyl ketone, 1-hydroxycyclohexyl phenyl ketone, 2-methyl-4-methylthio-2-morpholinopropiophenone, and 2-benzyl-2-dimethylamino-1-(4-morpholinophenyl)-butanone. Examples of the benzoins are benzoin benzenesulfonate, benzoin toluenesulfonate, benzoin methyl ether, benzoin ethyl ether, and benzoin isopropyl ether. Examples of the benzophenones are benzophenone, 2,4-dichlorobenzophenone, 4,4-dichlorobenzophenone, and p-chlorobenzophenone. Examples of the phosphine oxides include 2,4,6-trimethylbenzoyldiphenylphosphine oxide.

Additional examples of useful photo radical initiators are described in Saishin UV Kouka Gijyutu, Technical Information Institute Co., Ltd., 1991, 159.

Commercially available photo-cleaving radical initiators that are preferably used in the invention include Irgacure series (651, 184, and 907) from Ciba-Geigy Japan Ltd.

The photo polymerization initiator is preferably used in an amount of 0.1 to 15 parts by weight, still preferably 1 to 10 parts by weight, per 100 parts by weight of the polyfunctional monomer. A photo sensitizer may be used in addition to the photo polymerization initiator. Suitable photo sensitizers include n-butylamine, triethylamine, tri-n-butylphosphine, Michler's ketone, and thioxanthone.

The thermal radical initiators include organic or inorganic peroxides, and organic azo and diazo compounds. Examples of the organic peroxides are benzoyl peroxide, halogen-substituted benzoyl peroxides, lauroyl peroxide, acetyl peroxide, dibutyl peroxide, cumene hydroperoxide, and butyl hydroperoxide. Examples of the inorganic peroxides are hydrogen peroxide, ammonium persulfate, and potassium persulfate. Examples of the azo compounds are 2-azobisisobutyronitrile, 2-azobispropionitrile, and 2-azobiscyclohexanedinitrile. Examples of the diazo compounds are diazoaminobenzene and p-nitrobenzene diazonium.

As stated above, polymers having a polyether as a main chain are also useful as a film forming binder. The polymer having a polyether main chain is preferably a ring open polymerization product of a polyfunctional epoxy compound. Ring open polymerization of a polyfunctional epoxy compound is performed by irradiation with an ionizing radiation or heating in the presence of a photo acid generator or a thermal acid generator.

The optical film of the invention will be explained below, by taking the antireflection film as an example.

A monomer having a crosslinking functional group may be used in addition to, or in place of, the monomer having two or more ethylenically unsaturated group to produce a polymer having a crosslinking functional group, which reacts to introduce a crosslinked structure into the binder polymer.

Examples of the crosslinking functional group include an isocyanate group, an epoxy group, an aziridine group, an oxazoline group, an aldehyde group, a carbonyl group, a hydrazine group, a carboxyl group, a methylol group, and an active methylene group. Other monomers useful to introduce a crosslinked structure include vinylsulfonic acid, acid anhydrides, cyanoacrylate derivatives, melamines, etherified methylols, esters, urethanes, and metal alkoxides such as tetramethoxysilane. Functional groups capable of developing crosslinkability upon being decomposed, such as a blocked isocyanate group, are also effective. In other words, the term "crosslinking functional group" as used herein includes not only a group ready to crosslink but a group that decomposes to develop crosslinking reactivity.

The binder polymer having such a crosslinking functional group forms a crosslinked structure on being heated after application.

The low refractive layer of the antireflection film is preferably formed by using the coating composition of the invention.

The low refractive layer is preferably a cured film of a copolymer essentially comprising a repeating unit derived from a fluorine-containing vinyl monomer and a repeating unit having a (meth)acryloyl group in the side chain thereof (hereinafter sometimes referred to as a fluoropolymer). It is preferred that at least 60% by weight, still preferably 70% by weight or more, particularly preferably 80% by weight or more, of the solids content of the coating film be derived from the copolymer. In order to achieve high film strength as well as a low refractive index, a curing agent, such as a polyfunctional (meth)acrylate, is preferably added to the coating composition within an amount compatible with the other components.

The low refractive layer preferably has a refractive index of 1.20 to 1.46, still preferably 1.25 to 1.46, particularly preferably 1.30 to 1.46.

The low refractive layer preferably has a thickness of 50 to 200 nm, still preferably 70 to 100 nm. The haze of the low refractive layer is preferably 3% or less, still preferably 2% or less, particularly preferably 1% or less. The low refractive layer preferably has a pencil hardness of H or higher, still preferably 2H or higher, particularly preferably 3H or higher, as measured under a load of 500 g.

In order to assure antifogging properties of the optical film, the water contact angle of the surface of the low refractive layer is preferably 90° or greater, still preferably 95° or greater, particularly preferably 100° or greater.

The fluoropolymer that is preferably used to form the low refractive layer will be described in more detail.

Examples of the fluorine-containing vinyl monomer include fluoroolefins (e.g., fluoroethylene, vinylidene fluoride, tetrafluoroethylene, and hexafluoropropylene), partially or completely fluorinated alkyl ester derivatives of (meth)acrylic acid (e.g., Viscoat 6FM available from Osaka Organic Chemical Industry Ltd. and R-202 available from Daikin Industries, Ltd.), and partially or completely fluorinated vinyl ethers. Perfluoroolefins are preferred. Hexafluoropropylene is particularly preferred from the standpoint of refractive index, solubility, transparency, and availability. As the copolymerization ratio of the fluorine-containing vinyl monomer increases, the refractive index becomes smaller, but the film strength decreases. From this viewpoint, the fluorine-containing vinyl monomer is preferably used to give a fluorine content of 20% to 60% by weight, still preferably 25% to 55% by weight, particularly preferably 30% to 50% by weight, in the resulting copolymer.

The fluoropolymer preferably contains a repeating unit having a (meth)acryloyl group in the side chain thereof. As the ratio of the (meth)acryloyl group-containing repeating unit increases, the film strength increases, but the refractive index also increases. A preferred ratio of the (meth)acryloyl group-containing repeating unit in the copolymer is generally 5% to 90% by weight, still preferably 30% to 70% by weight, particularly preferably 40% to 60% by weight, while varying depending on the fluorine-containing vinyl monomer to be combined with.

In addition to the fluorine-containing vinyl monomer unit and the (meth)acryloyl group-containing unit, the copolymer can contain one or more kinds of repeating units derived from other vinyl monomers for improving adhesion to a substrate, adjusting the glass transition temperature (Tg) that contributes to the film strength, and improving the solubility in a solvent, transparency, slip properties, antidust and antifouling properties, and the like. The ratio of the other vinyl monomer units in the copolymer is preferably up to 65 mol %, still preferably 0 to 40 mol %, particularly preferably 0 to 30 mol %.

Examples of useful other vinyl monomers include olefins (e.g., ethylene, propylene, isoprene, vinyl chloride, and vinylidene chloride), acrylic esters (e.g., methyl acrylate, ethyl acrylate, 2-ethylhexyl acrylate, and 2-hydroxyethyl acrylate), methacrylic esters (e.g., methyl methacrylate, ethyl methacrylate, butyl methacrylate, and 2-hydroxyethyl methacrylate), styrene derivatives (e.g., styrene, p-hydroxymethylstyrene, and p-methoxystyrene), vinyl ethers (e.g., methyl vinyl ether, ethyl vinyl ether, cyclohexyl vinyl ether, hydroxyethyl vinyl ether, and hydroxybutyl vinyl ether), vinyl esters (e.g., vinyl acetate, vinyl propionate, and vinyl cinnamate), unsaturated carboxylic acids (e.g., acrylic acid, methacrylic acid, crotonic acid, maleic acid, and itaconic acid), acrylamides (e.g., N,N-dimethylacrylamide, N-t-butylacrylamide, and N-cyclohexylacrylamide), methacrylamides (e.g., N,N-dimethylmethacrylamide), and acrylonitrile.

Of the above-described fluoropolymers preferred are those represented by formula (A):

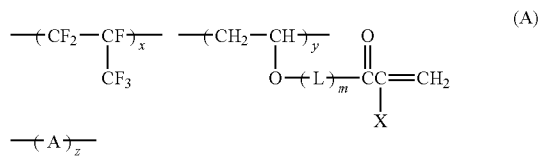

wherein L represents a linking group having 1 to 10 carbon atoms; m represents 0 or 1; X represents a hydrogen atom or a methyl group; A represents a repeating unit derived from at least one vinyl monomer; and x, y, and z represent mole percents of the respective repeating units in ranges $30 \leq x \leq 60$, $5 \leq y \leq 70$, and $0 \leq z \leq 65$.

In formula (A), L is preferably a linking group having 1 to 6 carbon atoms, still preferably a linking group having 2 to 4 carbon atoms. The linking group may be straight-chain or branched or may contain a cyclic structure. The linking group may contain a hetero atom selected from O, N, and S. Examples of preferred linking groups L are *—$(CH_2)_2$—O—**, *—$(CH_2)_2$—NH—**, *—$(CH_2)_4$—O—**, *—$(CH_2)_6$—O—**, *—$(CH_2)_2$—O—$(CH_2)_2$—O—**, *—CONH—$(CH_2)_3$—O—**, *—$CH_2CH(OH)CH_2$—O—**, and *—$CH_2CH_2OCONH(CH_2)_3$—O—** (wherein * indicates the position at which to link to the main chain of the polymer; and ** indicates the position at which to link to the (meth)acryloyl group). X is preferably a hydrogen atom from the viewpoint of curing reactivity.

The repeating unit represented by A is not particularly limited as long as it is derived from a vinyl monomer or monomers copolymerizable with hexafluoropropylene. The vinyl monomer or monomers providing the unit A can be chosen according to the purpose, for example, improvement of adhesion to a substrate, adjustment of the glass transition temperature (Tg) that contributes to the film strength, and improvement of solubility in a solvent, transparency, slip properties, and antidust or antifouling properties.

Examples of suitable vinyl monomers providing the unit A include vinyl ethers (e.g., methyl vinyl ether, ethyl vinyl ether, t-butyl vinyl ether, cyclohexyl vinyl ether, isopropyl vinyl ether, hydroxyethyl vinyl ether, hydroxybutyl vinyl ether, glycidyl vinyl ether, and allyl vinyl ether), vinyl esters (e.g., vinyl acetate, vinyl propionate, and vinyl butyrate), (meth)acrylates (e.g., methyl (meth)acrylate, ethyl (meth)acrylate, hydroxyethyl (meth)acrylate, glycidyl methacrylate, allyl (meth)acrylate, and (meth)acryloyloxypropyltrimethoxysilane), styrene derivatives (e.g., styrene and p-hydroxymethylstyrene), and unsaturated carboxylic acids (e.g., crotonic acid, maleic acid, and itaconic acid) and derivatives thereof. Preferred of them are vinyl ether derivatives and vinyl ester derivatives, with the vinyl ether derivatives being particularly preferred.

x, y, and z preferably represent numbers in ranges: $35 \leq x \leq 55$, $30 \leq y \leq 60$, and $0 \leq z \leq 20$, still preferably $40 \leq x \leq 55$, $40 \leq y \leq 55$, and $0 \leq z \leq 10$.

Of the copolymers represented by formula (A) preferred are those represented by formula (B):

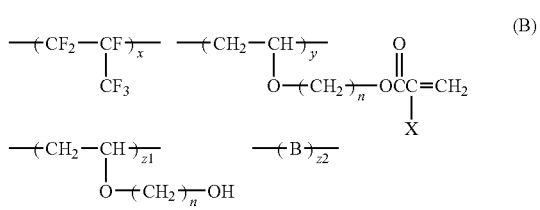

wherein X, x, and y are as defined for formula (A) (preferred ranges of X, x, and y are the same as those described above); n represents an integer of 2 to 10; B represents a repeating unit derived from at least one vinyl monomer; and z1 and z2 represent mole percents of the respective repeating units in ranges: $0 \leq z1 \leq 65$ and $0 \leq z2 \leq 65$.

In formula (B), n is preferably 2 to 6, still preferably 2 to 4. Examples of the repeating unit B are the same as those enumerated for the repeating unit A. z1 is preferably 0 to 30, still preferably 0 to 10, and z2 is preferably 0 to 10, still preferably 0 to 5.

The fluoropolymer represented by formula (A) (preferably formula (B)) is synthesized by, for example, introducing a (meth)acryloyl group into a copolymer containing a hexafluoropropylene component and a hydroxyalkyl vinyl ether component. The copolymer can be prepared by the process described in JP-A-2004-45462.

Examples of the fluoropolymers that are preferably used to form the low refractive layer of the antireflection film are listed below.

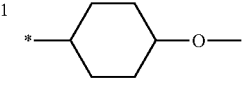

| | x | y | m | L1 | X | Number Average Molecular Weight $Mn (\times 10^4)$ |
|---|---|---|---|---|---|---|
| P-1 | 50 | 0 | 1 | *—CH$_2$CH$_2$O— | H | 3.1 |
| P-2 | 50 | 0 | 1 | *—CH$_2$CH$_2$O— | CH$_3$ | 4.0 |
| P-3 | 45 | 5 | 1 | *—CH$_2$CH$_2$O— | H | 2.8 |
| P-4 | 40 | 10 | 1 | *—CH$_2$CH$_2$O— | H | 3.8 |
| P-5 | 30 | 20 | 1 | *—CH$_2$CH$_2$O— | H | 5.0 |
| P-6 | 20 | 30 | 1 | *—CH$_2$CH$_2$O— | H | 4.0 |
| P-7 | 50 | 0 | 0 | — | H | 11.0 |
| P-8 | 50 | 0 | 1 | *—C$_4$H$_8$O— | H | 0.8 |
| P-9 | 50 | 0 | 1 | *—(CH$_2$)$_2$—O—(CH$_2$)$_2$—O— | H | 1.0 |
| P-10 | 50 | 0 | 1 | *—⟨cyclohexyl⟩—O— | H | 7.0 |

*indicates the polymer main chain side.

| | x | y | m | L1 | X | Number Average Molecular Weight $Mn (\times 10^4)$ |
|---|---|---|---|---|---|---|
| P-11 | 50 | 0 | 1 | *—CH$_2$CH$_2$NH— | H | 4.0 |
| P-12 | 50 | 0 | 1 | *—CH$_2$CH$_2$OC(O)NHCH$_2$CH$_2$O— | H | 4.5 |
| P-13 | 50 | 0 | 1 | *—CH$_2$CH$_2$OC(O)NHCH$_2$CH$_2$O— | CH$_3$ | 4.5 |
| P-14 | 50 | 0 | 1 | *—CH$_2$CH$_2$CH$_2$CH$_2$OC(O)NHCH$_2$CH$_2$O— | CH$_3$ | 5.0 |
| P-15 | 50 | 0 | 1 | *—CH$_2$CH(OH)CH$_2$O— | H | 3.5 |
| P-16 | 50 | 0 | 1 | *—CH$_2$CH(CH$_2$OH)O— | H | 3.0 |
| P-17 | 50 | 0 | 1 | *—CH$_2$CH$_2$OCH$_2$—CH(OH)CH$_2$O— | H | 3.0 |
| P-18 | 50 | 0 | 1 | *—CH$_2$OCH$_2$CH(OH)—CH$_2$O— | CH$_3$ | 3.0 |

-continued

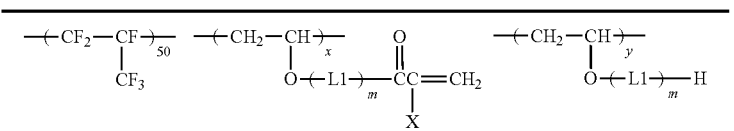

|  | x | y | m | L1 | X | Number Average Molecular Weight Mn (×10⁴) |
|---|---|---|---|---|---|---|
| P-19 | 50 | 0 | 1 | *—CH₂OCH₂CH(CH₂OH)—O— | CH₃ | 3.0 |
| P-20 | 40 | 10 | 1 | *—CH₂CH₂O— | CH₃ | 0.6 |

*indicates the polymer main chain side.

$$\text{−(CF}_2\text{−CF(CF}_3\text{))}_a\text{−(CH}_2\text{−CH(O−L1−C(O)CH=CH}_2\text{))}_b\text{−(A)}_c$$

|  | a | b | c | L1 | A | Number Average Molecular Weight Mn (×10⁴) |
|---|---|---|---|---|---|---|
| P-21 | 55 | 45 | 0 | *—CH₂CH₂O—** | — | 1.8 |
| P-22 | 45 | 55 | 0 | *—CH₂CH₂O—** | — | 0.8 |
| P-23 | 50 | 45 | 5 | *—CH₂CH₂OC(O)NHCH₂CH₂O—** | —CH₂—CH(OCH₂CH₂OH)— | 0.7 |
| P-24 | 50 | 45 | 5 | *—CH₂CH(OH)—CH₂O—** | —CH₂—CH(O—CH₂—epoxide)— | 4.0 |
| P-25 | 50 | 45 | 5 | *—CH₂CH(CH₂OH)O—** | —CH₂—CH(O—CH₂—epoxide)— | 4.0 |
| P-26 | 50 | 40 | 10 | *—CH₂CH₂O—** | —CH₂—CH(OCH₂CH₃)— | 4.0 |
| P-27 | 50 | 40 | 10 | *—CH₂CH₂O—** | —CH₂—CH(O-cyclohexyl)— | 4.0 |
| P-28 | 50 | 40 | 10 | *—CH₂CH₂O—** | —CH(CH₃)—CH(COOH)— | 5.0 |

*indicates the polymer main chain side.
**indicates the acryloyl group side.

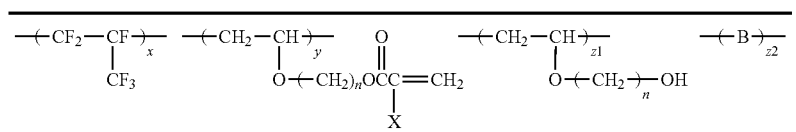

| | x | y | z1 | z2 | n | X | B | Number Average Molecular Weight Mn (×10⁴) |
|---|---|---|---|---|---|---|---|---|
| P-29 | 50 | 40 | 5 | 5 | 2 | H | —CH$_2$—CH(O—CH$_2$CH$_3$)— | 5.0 |
| P-30 | 50 | 35 | 5 | 10 | 2 | H | —CH$_2$—CH(O—C(CH$_3$)$_3$)— | 5.0 |
| P-31 | 40 | 40 | 10 | 10 | 4 | CH$_3$ | —CH$_2$—CH(O—C$_6$H$_{11}$)— | 4.0 |

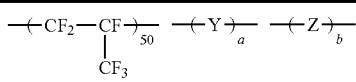

| | a | b | Y | Z | Number Average Molecular Weight Mn (×10⁴) |
|---|---|---|---|---|---|
| P-32 | 45 | 5 | —CH(CH$_3$)—CH(CO$_2$CH$_2$CH(OH)CH$_2$OCC(CH$_3$)=CH$_2$)— | —CH(CH$_3$)—CH(COOH)— | 4.0 |
| P-33 | 40 | 10 | —CH(CO$_2$H)—CH(CONHCH$_2$CH$_2$OCCH=CH$_2$)— | —CH—CH— (maleic anhydride ring) | 4.0 |

The above-described copolymers are synthesized by preparing a precursor, such as a hydroxyl-containing polymer, through various polymerization techniques, including solution polymerization, precipitation polymerization, suspension polymerization, bulk polymerization, and emulsion polymerization, and introducing a (meth)acryloyl group into the precursor through polymer reaction. The polymer reaction is conducted by known processes, such as a batch process, a semi-continuous process, and a continuous process.

The polymerization is initiated by using a radical initiator or irradiating with light or a radiation. The polymerization processes and the methods of polymerization initiation are described, e.g., in Teiji Turuta, *Kobunshi Gosei Houhou*, Rev. Ed., Nikkan Kogyo Shinbun, 1971 and Takayuki Ohtu and Masaetu Kinoshita, *Kobunshi Gosei no Jikkenho*, Kagaku Dojin, 1972, 124-154.

Of the above-recited polymerization techniques, solution polymerization using a radical initiator is preferred. Various organic solvents can be used to effect solution polymerization. Examples of useful solvents include ethyl acetate, butyl acetate, acetone, methyl ethyl ketone, methyl isobutyl ketone, cyclohexanone, tetrahydrofuran, dioxane, N,N-dimethylformamide, N,N-dimethylacetamide, benzene, toluene, acetonitrile, methylene chloride, chloroform, dichloroethane, methanol, ethanol, 1-propanol, 2-propanol, and 1-butanol, and mixtures thereof. A mixed solvent of the organic solvent and water is also useful.

The polymerization temperature is decided in connection with a desired molecular weight of the polymer produced, the kind of the initiator used, and the like. It may be lower than 0° C. or higher than 100° C., but preferably ranges from 50° to 100° C.

The reaction pressure is decided appropriately. It usually ranges from about 0.98 to 98 kPa, preferably about 0.98 to 30 kPa. The reaction time is usually about 5 to 30 hours.

Solvents that can be used for re-precipitation of the resulting polymer preferably include isopropyl alcohol, hexane, and methanol.

The inorganic oxide particles that are suited for use in the low refractive layer of the antireflection layer will then be described. The amount of the inorganic oxide particles to be applied is preferably 1 to 100 mg/m², still preferably 5 to 80 mg/m², particularly preferably 10 to 60 mg/m². Where the amount of the inorganic particles applied is too small, the effect of improving scratch resistance is insubstantial. Where too large an amount of the particles is applied, the surface of the low refractive layer has fine unevenness, which can result in deterioration of appearance (including black tone or density) and integrated reflectance.

It is desirable of necessity that the inorganic oxide particles, being used in the low refractive layer, have a low refractive index. Specifically, the aforementioned surface-treated inorganic oxide particles, including solid particles and hollow particles, such as silica or hollow silica particles, dispersed in an organic solvent which have a low refractive index are used. The silica particles preferably have an average particle size of 30% to 150%, still preferably 35% to 80%, particularly preferably 40% to 60%, of the thickness of the low refractive layer. When the low refractive layer is 100 nm thick, for example, the silica particles preferably have an average particle size of 30 to 150 nm, still preferably 35 to 80 nm, particularly preferably 40 to 60 nm.

If the silica particles are too small, the scratch resistance improving effect would be insubstantial. If the particles are too large, the low refractive layer would suffer from fine surface unevenness, resulting in deterioration of appearance (such as black tone or density) and integrated reflectance. The silica particles may be either crystalline or amorphous and may be mono-dispersed particles or poly-dispersed particles containing agglomerates as long as the particle size requirement is satisfied. While spherical particles are the most desirable, irregularly shaped particles are useful as well. The average particle size of the inorganic particles as referred to here is the one measured with a Coulter counter.

In order for the low refractive layer to have a low refractive index, hollow silica particles are preferred. Hollow silica particles have a refractive index of 1.17 to 1.40, preferably 1.17 to 1.35, still preferably 1.17 to 1.30. The term "refractive index of hollow silica particles" does not mean the refractive index of only the outer shell forming the individual hollow particles (i.e., the silica per se) but the one of the spherical particle as a whole. Taking the radius of the cavity of a hollow particle and the outer radius of the shell as "a" and "b", respectively, the cavity ratio x is calculated according to equation:

$$x=(4\pi a^3/3)/(4\pi b^3/3)\times 100$$

The cavity ratio x is preferably 10% to 60%, still preferably 20% to 60%, particularly preferably 30% to 60%. As the cavity ratio increases, the shell thickness decreases to reduce the refractive index, but the strength of the particles reduces. Therefore, particles having a refractive index smaller than 1.17 are impractical from the standpoint of scratch resistance.

The refractive index of the hollow silica particles was measured with an Abbe refractometer (supplied by Atago KK).

Incorporation of hollow particles into the low refractive layer is effective in reducing the refractive index of the layer. The low refractive layer containing hollow particles preferably has a refractive index of 1.20 to 1.46, still preferably 1.25 to 1.41, particularly preferably 1.30 to 1.39.

It is preferred to use fine silica particles whose average particle size is smaller than 25% of the thickness of the low refractive layer (hereinafter referred to as small-size silica particles) in combination with silica particles having the above-recited average particle size (hereinafter referred to as large-size silica particles). The small-size silica particles can exist in the interstices between the large-size silica particles and thereby serve to support the large size silica particles.

When the thickness of the low refractive layer is 100 nm, the small-size silica particles preferably have an average particle size of 1 to 20 nm, still preferably 5 to 15 mm, particularly preferably 10 to 15 nm. Use of silica particles of that size is preferred from the viewpoint of material cost and the supporting effect.

To secure improved film strength, it is preferred to add to the coating composition a hydrolyzate and/or a partial condensate of an organosilane compound. To synthesize a partial condensate of an organosilane compound (hereinafter referred to as sol), the acid catalysts and the metal chelate compounds useful in the surface treatment of the inorganic oxide particles can be used. The sol is preferably added in an amount of 2% to 200% by weight, still preferably 5% to 100% by weight, particularly preferably 10% to 50% by weight, based on the inorganic oxide particles.

It is preferred to reduce the surface free energy of the antireflection layer for improving antifouling properties. This can be done by incorporating into the low refractive layer a fluorine-containing compound or a compound having a polysiloxane structure, such as a reactive group-containing polysiloxane. Reactive group-containing polysiloxanes are available from Shin-Etsu Chemical Co., Ltd. under trade names KF-100T, X-22-169AS, KF-102, X-22-3701IE, X-22-164B, X-22-5002, X-22-173B, X-22-174D, X-22-167B, and X-22-161AS; from Toagosei Co., Ltd. under trade names AK-5, AS-30, and AK-32; and from Chisso Corp. under trade names Silaplane FM 0725 and Silaplane FM 0721. The silicone compounds described in JP-A-2003-112383, Tables 2 and 3 are also useful. A preferred amount of the polysiloxane to be added is 0.1% to 10% by weight, still preferably 1% to 5% by weight, based on the total solids content of the low refractive layer.

The low refractive layer is preferably formed by applying the coating composition having a fluorine-containing compound and other optional components dissolved or dispersed therein and curing the applied layer either simultaneously with application or after application and drying. Curing is accomplished by crosslinking or polymerization induced by irradiation with an ionizing radiation (e.g., light or an electron beam) or heating.

Where the low refractive layer is formed by crosslinking or polymerization of an ionizing radiation-curing compound, the crosslinking or polymerization reaction is preferably effected in an atmosphere having an oxygen concentration controlled to 10% by volume or lower. By so doing, a low refractive layer with high physical strength and excellent chemical resistance required of the outermost layer can be formed. The oxygen concentration is desirably 6% or lower, more desirably 4% or lower, particularly desirably 2% or lower, most desirably 1% or lower, by volume.

The oxygen concentration control is preferably achieved by replacing the air (about 79% nitrogen and about 21% oxygen) with another gas, particularly nitrogen (i.e., purge with nitrogen).

The antireflective film of the invention preferably has a high refractive layer provided on the substrate in addition to the low refractive layer. The high refractive layer can be formed of a binder, matte particles for imparting antiglare properties, and an inorganic filler for increasing a refractive index and film strength and preventing shrinkage on crosslinking.

The matte particles, which are particles larger than filler particles and are added for imparting antiglare properties, include inorganic particles and resin particles having an average particle size of 0.1 to 5.0 μm, preferably 1.5 to 3.5 μm. The difference in refractive index between the matte particles and the binder is preferably 0.02 to 0.20, still preferably 0.04 to 0.10. If the difference is too large, the layer would be cloudy. Too small a difference results in a failure to exert sufficient light scattering effect. The amount of the matte particles to be used preferably ranges from 3% to 30% by weight, more preferably 5% to 20% by weight, based on the binder. If the matte particles are used in too much an amount, the film would be cloudy. If added in too small an amount, the matte particles cannot produce sufficient light scattering effect.

Examples of suitable matte particles include particles of inorganic compounds, such as silica and $TiO_2$; and particles of resins, such as acrylic resins, crosslinked acrylic resins, polystyrene, crosslinked polystyrene, melamine resins, and benzoguanamine resins. Crosslinked polystyrene particles, crosslinked acrylic resin particles, and silica particles are preferred. The matte particles may be spherical or amorphous.

Different kinds of matte particles can be used in combination. When refractive index control is aimed at, it is effective to use two or more kinds of matte particles different in refractive index preferably by 0.02 to 0.10, still preferably 0.03 to 0.07. It is also possible to use a combination of relatively large matte particles for securing antiglare performance and relatively small matte particles for imparting another desired optical property. For instance, an optical film is required to be free from an optical defect called glare when stuck to a high precision display with a resolution of 133 ppi or more. Glare, which is ascribed to a luminance distribution due to enlargement or reduction of pixels by the fine surface unevenness (contributory to anti-glare) of the film, is greatly reduced by a combination of large matte particles for antiglare properties and matte particles smaller than the large ones and having a different refractive index from the binder.

It is preferred that the matte particles of a kind be monodispersed. That is, it is preferred for the individual particles to be as close as possible to each other in size. Particles whose diameters are, for example, 20% or more greater than the average particle size being taken as coarse particles, it is desirable that the proportion of such coarse particles be not more than 1%, more desirably 0.1% or less, most desirably 0.01% or less, of the total number of particles. Matte particles having such a narrow size distribution can be obtained by classifying the particles as synthesized in a usual manner. Classification can be performed repeatedly or to an increased degree to obtain a desired particle size distribution.

The matte particles are used in the high refractive layer preferably in an amount of 10 to 1000 mg/m$^2$, still preferably 100 to 700 mg/m$^2$. The particle size distribution of the matte particles is measured with a Coulter counter, and the measured distribution is converted to a particle number distribution.

In addition to the matte particles the high refractive layer preferably contains an inorganic filler to increase the refractivity and to suppress shrinkage on curing. The inorganic filler includes oxides of at least one of titanium, zirconium, aluminum, indium, zinc, tin, and antimony and has an average particle size of 0.2 μm or smaller, preferably 0.1 μm or smaller, still preferably 0.06 μm or smaller. Where the high refractive layer contains matte particles having a high refractive index, it is preferred to incorporate silicon oxide particles into the high refractive layer so as to increase the difference in refractivity between the high-refractive matte particles and the other part of the high refractive layer. A preferred particle size of the silicon oxide particles is the same as that of the inorganic filler.

Specific examples of the inorganic filler useful in the high refractive layer include $TiO_2$, $ZrO_2$, $Al_2O_3$, $In_2O_3$, $ZnO$, $SnO_2$, $Sb_2O_3$, ITO, and $SiO_2$. $TiO_2$ and $ZrO_2$ are preferred of them for their high refractive indices. Titanium oxide particles are particularly preferred for their high refractive index.

Where a coating composition contains a monomer and an initiator, the coating film is irradiated with an ionizing radiation or heated to cause the monomer to polymerize (cure) thereby to form a middle refractive layer or a high refractive layer with high scratch resistance and good adhesion. The average particle size of the inorganic particles in the layer is preferably 20 to 120 nm, still preferably 30 to 100 nm, particularly preferably 40 to 90 nm, taking into consideration haze, dispersion stability, and moderate film surface roughness for adhesion to an upper layer and, in the case of $TiO_2$, for suppressing photoactivity of $TiO_2$.

Titanium dioxide particles to be used are preferably those containing titanium dioxide as a main component and at least one element selected from the group consisting of cobalt, aluminum, and zirconium as a minor component. The term "main component" as used above means a component of which the content is the highest of all the other components making up the particles. The inorganic particles containing titanium oxide as a main component preferably have a refractive index of 1.90 to 2.80, still preferably 2.10 to 2.80, particularly preferably 2.20 to 2.80. The inorganic particles containing titanium oxide as a main component preferably have a primary particle size of 1 to 200 nm, still preferably 1 to 150 nm, particularly preferably 1 to 100 nm, especially preferably 1 to 80 nm.

The particle size of the inorganic particles can be measured by a light scattering method or from an electron micrograph. The inorganic particles preferably have a specific surface area of 10 to 400 m$^2$/g, still preferably 20 to 200 m$^2$/g, particularly preferably 30 to 150 m$^2$/g.

The inorganic particles containing titanium dioxide as a main component preferably have a main structural form selected from rutile, rutile/anatase, anatase, and amorphous. The particles are particularly preferably those containing a rutile structure as a main component. The term "main component" as used here means a component the content of which is the highest of all the other components making up the particles.

The inorganic particles containing titanium dioxide as a main component and at least one element selected from cobalt, aluminum, and zirconium as a minor component have the photocatalysis attributed to titanium dioxide suppressed so that the high refractive layer or the middle refractive layer containing the particles may exhibit improved weather resistance. Cobalt is preferred as a minor component. The inorganic particles containing two or more of cobalt, aluminum and zirconium are also preferred.

The inorganic filler can be surface treated with a silane coupling agent or a titan coupling agent. A coupling agent providing the surface of the filler particles with a functional group reactive with a binder is preferably used. The inorganic filler is preferably used in an amount of 10% to 90% by weight, still preferably 20% to 80% by weight, particularly preferably 30% to 70% by weight, based on the total weight of the high refractive layer.

Since the inorganic filler is sufficiently smaller in diameter than the wavelength of light, it does not cause light scattering. Therefore, a disperse system of the filler in a binder polymer behaves as an optically uniform substance.

The bulk (overall) refractive index of the high refractive layer made of a binder and an inorganic filler is preferably 1.48 to 2.00, still preferably 1.50 to 1.80. The kinds and the compounding ratio of the binder and the filler are selected so as to result in a bulk refractive index in the above range. The selection can be done through previous experimentation.

The antireflection film according to the present invention has a haze of 3% to 70%, preferably 4% to 60%, and an average reflectance of 3.0% or smaller, preferably 2.5% or smaller, in a wavelength range of from 450 nm to 650 nm.

As long as the antireflection film has a haze and an average reflectance falling within the above-recited respective ranges, it exhibits satisfactory antiglare and antireflection performance without being accompanied by deterioration of transmitted image quality.

The transparent substrate that can be used in the optical film of the invention is preferably a plastic film. Polymers forming a plastic film substrate include cellulose esters, such as cellulose triacetate and cellulose diacetate (e.g., TAC-TD80U and TD80UF available from Fuji Photo Film Co., Ltd.), polyamide, polycarbonate, polyesters, such as polyethylene terephthalate and polyethylene naphthalate, polystyrene, polyolefins, norbornene resins (e.g., Arton available from JSR Corp.), and amorphous polyolefins (e.g., Zeonex available from Zeon Corp.). Preferred of them are cellulose triacetate, polyethylene terephthalate, and polyethylene naphthalate, with cellulose triacetate being particularly preferred. A cellulose acylate film substantially free of halogenated hydrocarbon (e.g., dichloromethane) is also a preferred substrate for use in the invention. Such a cellulose acylate film and a process of producing the same are disclosed in Journal of Technical Disclosure 2001-1745 published by Japan Institute of Invention and Innovation.

For applications to displays such as LCDs, the optical film of the invention can have an adhesive layer provided on the back side of the substrate thereof. As described later, the optical film of the invention which uses a cellulose triacetate base film is economically advantageous for use as at least one of protective films for a polarizing film of a polarizing plate because a polarizing film of a polarizing plate is commonly sandwiched in between a pair of cellulose triacetate films.

For applications to displays as an outermost layer or for applications as a protective film of polarizing plates, it is preferred that the optical film such as the antireflection film be subjected to saponification after the formation of an outermost layer mainly comprising the fluoropolymer. Saponification is carried out in a known manner, for example, by immersing the film in an alkali solution for a proper period of time. After the immersion, the film is thoroughly washed with water or immersed in a dilute acid solution for neutralization to completely remove the alkali component from the film. As a result of the saponification treatment, the back side of the transparent substrate (opposite to the outermost layer side) is made hydrophilic. The thus hydrophilized surface is particularly advantageous for adhesion to a polarizing film mainly comprising polyvinyl alcohol. In addition, the hydrophilized surface is less attractive to dust and is therefore advantageous for preventing dust in air from entering between the substrate and the polarizing film and causing spot defects.

The saponification treatment is preferably conducted so that the back side of the substrate (opposite to the outermost layer side of the optical film) may have a water contact angle of 40° or smaller, still preferably 30° or smaller, particularly preferably 20° or smaller.

The saponification treatment with an alkali is performed by (1) immersing the transparent substrate having the functional layer formed thereon in an alkali solution at least once or (2) coating an alkali solution to the back side of the transparent substrate having the functional layer formed thereon or the side of the transparent substrate opposite to the side on which an antireflection layer is to be provided, followed by heating, and followed by washing and/or neutralization. The method (1) is advantageous in that the film can be treated in the same manner as with a general-purpose cellulose triacetate film. However, the method (1) is disadvantageous in that the surface of the outermost layer is also saponified (hydrolyzed with the alkali) and therefore deteriorated and that the alkali solution, if remaining on the antireflecting layer, can soil the surface of the antireflecting layer. When these disadvantages are problematical, the method (2) is recommended, in which only the back side of the film is saponified.

A process of fabricating the optical film of the present invention will be described taking, for instance, the production of an antireflection film.

To begin with, coating compositions for the respective layers are prepared. The coating compositions are applied on a transparent substrate by dipping, air knife coating, curtain coating, roller coating, wire bar coating, gravure coating or extrusion (see U.S. Pat. No. 2,681,294) and dried by heating. Gravure coating is advisable for applying a very small amount of a coating composition to a uniform thickness as demanded in the present invention. Inter alia, microgravure coating is recommended for achieving a uniform coating thickness.

A slot die coating technique is also suitable for applying a small amount of a coating composition to a uniform thickness. With a slot die coater, it is relatively easy to control the film thickness because the coating fluid is pre-metered. Additionally, a slot die coater is a fully enclosed system that reduces evaporation of the solvent. Two or more layers can be applied simultaneously by slot die coating. In this regard, reference can be made to U.S. Pat. Nos. 2,761,791, 2,941,898, 3,508,947, and 3,526,528 and Yuji Harasaki, *Coating Kogaku*, Asakura Shoten, 1973, 253.

It is preferred for the production cost that at least two of a plurality of optical layers constituting the antireflection layer of the antireflection film be formed on a single web coating line including the steps of feeding a web substrate, applying continuous layers of the respective coating compositions on the moving substrate, and taking up the coated substrate. Where the antireflection layer is composed of three layers, the three layers are preferably formed on such a single web coating line. The web coating line is a line having in series any number of a set of a work station and associated curing/drying equipment between an unwind or feed station and a rewind station. The number of the set is preferably equal to the number of the optical layers to be formed.

FIG. 1 illustrates an example of a coating system configuration. The web coating line shown in FIG. 1 has a first work station (102), a first drying zone (103), a first UV irradiator (104), a second work station (105), a second drying zone (106), a second UV irradiator (107), a third work station (108), a third drying zone (109), a third UV irradiator (110), and a post-heating zone (111) between an unwind station (101) and a rewind station (112). On this web coating line is produced a multilayer film having up to three functional coating layers, for example, a film having middle-refractive layer/high-refractive layer/low-refractive layer, a film having hard coat layer/high-refractive layer/low-refractive layer, or a film having hard coat layer/antiglare layer/low-refractive layer. In a preferred modification of the system, a middle-refractive layer and a high-refractive layer are formed on a single web coating line having two work stations, and the coated web is inspected for the surface condition, film thickness, etc. The inspection data are fed back to the system control to improve the yield. In another modification, a dual-layer, antiglare antireflection film having an antiglare layer and a low-refractive layer can be produced at low cost on the web coating line having two work stations. In another preferred modification, a four-layered antireflection film having a hard coat layer, a middle-refractive layer, a high refractive layer, and a low refractive layer can be produced at a markedly reduced cost on a web coating line having four work stations. It would be desirable from the standpoint of cost and space saving to use only a UV curing resin as a film forming binder and to omit the post heating zone.

Basically, a polarizing plate is structured in 3 layers; a pair of protective films having a polarizing film sandwiched therebetween. The optical film, especially the antireflection film of the invention is preferably used as at least one of the protective films protecting the polarizing film of a polarizing plate. Using the optical film of the invention to serve as not only an antireflection film but a protective film results in reduction of production cost of polarizing plates. The polarizing plate having the antireflection film of the invention as an outermost layer prevents reflection of ambient light and has high scratch resistance and excellent antifouling properties.

Polarizing films that can be used in the polarizing plate include known polarizing films and those cut out of a polarizing film of continuous length the absorption axis of which is neither parallel nor perpendicular to the machine direction. A polarizing film of continuous length the absorption axis of which is neither parallel nor perpendicular to the machine direction is prepared as follows. A continuously fed web of a polymer is held in tension by its edges in a framework having a pair of engaging means and widthwise stretched 1.1 to 20.0 times. The engaging means on opposite sides move in the longitudinal direction of the web at the respective speeds different by within 3%. As a result, the moving direction of the web while being held by both edges describes a curve so that the moving direction and the practical stretch direction make an angle of 20° to 70° at the outlet of the framework. The angle between the web moving direction and the stretch direction is preferably 45° for productivity.

For the details of the method of stretching a polymer web, reference can be made to JP-A-2002-86554, paragraphs [0020] through [0030].

The polarizing plate which has the antireflection film of the invention as one of the surface protective films is suited for applications to transmissive, reflective or semi-transmissive LCDs (including twisted nematic (TN) mode, super twisted nematic (STN) mode, vertical alignment (VA) mode, in-plane switching (IPS) mode, optically compensated bend (OCB) mode, and electrically controlled birefringence (ECB) mode).

The VA mode liquid crystal cells include not only (1) a narrowly-defined VA mode liquid cell in which rod-like liquid crystal molecules are aligned substantially vertically with no voltage applied (in an off state) and aligned substantially horizontally on voltage application (in an on state) (see JP-A-2-176625) but also (2) a multi-domain vertical alignment (MVA) mode liquid crystal cell having a widened viewing angle (see SID' 97, Digest of Tech. Papers, 28, 1997, 845), (3) an n-ASM mode liquid crystal cell in which rod-like liquid crystal molecules are aligned substantially vertically in an off state and oriented in a twisted multi-domain mode in an on state (see Preprints of Japan Liquid Crystal Symposium, 1998, 58-59), and (4) a survival mode liquid crystal cell (released in LCD International '98).

A polarizing plate having a biaxially stretched cellulose triacetate (CTA) film in combination with the optical film of the present invention is preferred for applications to a VA mode liquid crystal cell. A biaxially stretched CTA film is preferably produced by the processes disclosed in JP-A-2001-249223 and JP-A-2003-170492.

The OCB mode liquid crystal cell is a liquid crystal cell in which rod-like liquid crystal molecules are oriented in substantially opposite directions (symmetrically) in the upper and lower parts of the cell (bend orientation) in an on state, which is disclosed in U.S. Pat. Nos. 4,583,825 and 5,410,422. Because of the bend orientation in which the rod-like liquid crystal molecules are oriented symmetrically about the middle of the cell thickness, the cell has an optical self compensation function, for which the cell of this type is called an optically compensated bend (OCB) mode cell. A bend mode liquid crystal cell is characterized by a short response time.

The ECB mode liquid crystal cell is a liquid crystal cell in which rod-like liquid crystal molecules are oriented substantially horizontally in an off state and which is used mostly in color TFT liquid crystal display devices. There is an abundant literature on the ECB mode liquid crystal cells, including *EL, PDP, LCD Displays*, Toray Research Center, 2001.

For applications to TN-mode or IPS-mode liquid crystal displays in particular, it is preferred for the polarizing plate of the invention to have an optically compensation film having a viewing angle widening effect disposed as one of the protective films (the other protective film is the antireflection film of the invention) as proposed in JP-A-2001-100043. Such a layer configuration produces both antireflection effect and viewing angle widening effect with the thickness of a single polarizing plate.

EXAMPLES

The present invention will now be illustrated in greater detail with reference to Examples, but it should be understood that the invention is not construed as being limited thereto. Unless otherwise noted, all the parts and percents are by weight.

Example 1

Stabilization of Inorganic Oxide Particles

1) Preparation of Dispersion A-1

Thirty parts of acryloyloxypropyltrimethoxysilane (M-1) and 1.5 parts of di(isopropoxy)(ethyl acetoacetato)aluminum were mixed into 333 parts of silica sol IPA-ST-L (silica sol in isopropyl alcohol, available from Nissan Chemical Industries, Ltd.; average particle size: 45 nm; silica concentration: 30%), and 9 parts of ion exchanged water was added thereto. The mixture was allowed to react at 60° C. for 8 hours, followed by cooling to room temperature. To the mixture was added 1.8 parts of acetylacetone to give dispersion A-1.

2) Preparation of Dispersion B-1

The same procedure as in (1) above was repeated, except for replacing IPA-ST-L with Methanol Silica Sol (silica sol in methanol, available from Nissan Chemical; average particle size: 12 nm; silica concentration: 30%) to obtain dispersion B-1.

3) Preparation of Dispersion C-1

The same procedure as in (1) above was repeated, except for replacing IPA-ST-L with 500 parts of hollow silica sol CS6-IPA (hollow silica sol in isopropyl alcohol available from Catalysts & Chemicals Industries Co., Ltd.; average particle size: 60 nm; shell thickness: 10 nm; silica concentration: 20%; refractive index (as a particle): 1.31) to obtain dispersion C-1.

4) Preparation of Dispersion D-1

Dispersion D-1 was prepared in the same manner as in (1) above, except for replacing IPA-ST-L with zirconium oxide sol in methyl ethyl ketone (available from Sumitomo Osaka Cement Co., Ltd.; average particle size: 10 nm; zirconium oxide concentration: 30%).

5) Preparation of Other Dispersions

Dispersions A-2 through 9, B-2 through 6, C-2 through 5, and D-2 through 4 were prepared in the same manner as for dispersions A-1, B-1, C-1, and D-1, respectively, except for changing the compound of formula (I) and/or the acid catalyst or the metal chelate compound as shown in Table 1 below.

Each of the resulting dispersions was evaluated as follows immediately after the preparation and after storage at 40° C. for 2 weeks. The results obtained are shown in Table 1.

i) Generation of Foreign Matter

A 10 ml portion of the dispersion was put into a 10 mm diameter test tube, inspected for any foreign matter with the naked eye, and rated as follows.

A: No foreign matter is observed.

B: Foreign matter of about 50 μm is slightly observed.

C: Foreign matter greater than 500 μm is obviously observed.

D: Foreign matter greater than 500 μm and an aggregated precipitate are obviously observed.

ii) Change in Viscosity

The viscosity of the dispersion was measured with a vibration type viscometer at 25° C.

TABLE 1

| | | Compound (I) | | Acid Catalyst or Metal Chelate Compound | | Foreign Matter | | Viscosity (mPa · s) | | |
|---|---|---|---|---|---|---|---|---|---|---|
| Dispersion | Inorganic Oxide Particles | Kind | Amount* | Kind | Amount* | Immed. after Prepn. | 2 wk at 40° C. | Immed. after Prepn. | 2 wk at 40° C. | Remark |
| A-1 | 45 nm silica | M-1 | 30 | di(isopropoxy)(ethyl acetoacetato)aluminum | 1.5 | A | A | 7 | 10 | invention |
| A-2 | 45 nm silica | " | 15 | di(isopropoxy)(ethyl acetoacetato)aluminum | 1.5 | A | A | 7 | 10 | invention |
| A-3 | 45 nm silica | " | 5 | di(isopropoxy)(ethyl acetoacetato)aluminum | 1.5 | A | A | 7 | 11 | invention |
| A-4 | 45 nm silica | " | 30 | none | 0.0 | A | C | 10 | 25 | comparison |
| A-5 | 45 nm silica | none | 0 | none | 0.0 | C | D | 15 | 30 | comparison |
| A-6 | 45 nm silica | M-2 | 30 | di(isopropoxy)(ethyl acetoacetato)aluminum | 1.5 | A | A | 7 | 11 | invention |
| A-7 | 45 nm silica | M-25 | 30 | di(isopropoxy)(ethyl acetoacetato)aluminum | 1.5 | A | A | 7 | 12 | invention |
| A-8 | 45 nm silica | M-1 | 30 | oxalic acid | 10.0 | A | A | 7 | 12 | invention |
| A-9 | 45 nm silica | " | 30 | malonic acid | 10.0 | A | A | 7 | 12 | invention |
| B-1 | 12 nm silica | " | 40 | di(isopropoxy)(ethyl acetoacetato)aluminum | 2.0 | A | A | 5 | 7 | invention |
| B-2 | 12 nm silica | M-2 | 40 | di(isopropoxy)(ethyl acetoacetato)aluminum | 2.0 | A | A | 5 | 8 | invention |
| B-3 | 12 nm silica | " | 40 | none | 0.0 | B | C | 10 | 30 | comparison |
| B-4 | 12 nm silica | none | 0 | none | 0.0 | C | D | 17 | 40 | comparison |
| B-5 | 12 nm silica | M-25 | 40 | di(isopropoxy)(ethyl acetoacetato)aluminum | 2.0 | A | A | 5 | 8 | invention |
| B-6 | 12 nm silica | M-1 | 40 | oxalic acid | 10.0 | A | A | 5 | 8 | invention |
| C-1 | 60 nm hollow silica | M-1 | 30 | di(isopropoxy)(ethyl acetoacetato)aluminum | 1.5 | A | A | 7 | 10 | invention |
| C-2 | 60 nm hollow silica | " | 30 | none | 0.0 | A | C | 8 | 25 | comparison |
| C-3 | 60 nm hollow silica | none | 0 | none | 0.0 | C | D | 15 | 35 | comparison |
| C-4 | 60 nm hollow silica | M-2 | 30 | di(isopropoxy)(ethyl acetoacetato)aluminum | 1.5 | A | A | 7 | 10 | invention |
| C-5 | 60 nm hollow silica | M-25 | 30 | di(isopropoxy)(ethyl acetoacetato)aluminum | 1.5 | A | A | 7 | 11 | invention |
| D-1 | 10 nm zirconium oxide | M-1 | 20 | di(isopropoxy)(ethyl acetoacetato)aluminum | 1.5 | A | A | 4 | 6 | invention |
| D-2 | 10 nm zirconium oxide | " | 20 | none | 0.0 | B | C | 5 | 20 | comparison |
| D-3 | 10 nm zirconium oxide | none | 0 | none | 0.0 | B | C | 7 | 25 | comparison |

TABLE 1-continued

| Dispersion | Inorganic Oxide Particles | Compound (I) Kind | Amount* | Acid Catalyst or Metal Chelate Compound Kind | Amount* | Foreign Matter Immed. after Prepn. | 2 wk at 40° C. | Viscosity (mPa·s) Immed. after Prepn. | 2 wk at 40° C. | Remark |
|---|---|---|---|---|---|---|---|---|---|---|
| D-4 | 10 nm zirconium oxide | M-2 | 20 | di(isopropoxy)(ethyl acetoacetato)aluminum | 1.5 | A | A | 4 | 6 | invention |

Note:
*parts per 100 parts by weight of the solid content of the inorganic oxide particles The following observations are drawn from the results in Table 1. The dispersions of inorganic oxide particles having been treated with (a) the compound of formula (I) and (b) the acid catalyst and/or the metal chelate compound suffer from less foreign matter generation and less increase in viscosity even when stored in high temperature, proving to be stable. In particular, those dispersions prepared using the metal chelate compound exhibit excellent stability, undergoing little change in viscosity with time.

In addition, a dispersion was prepared in the same manner as for dispersion C-1, except for replacing the di(isopropoxy)acetoacetatoaluminum with di(n-butoxy)bis(ethyl acetato)zirconium, and a dispersion was prepared in the same manner as for dispersion D-4, except for replacing the di(isopropoxy)acetoacetatoaluminum with di(isopropoxy)bis(ethyl acetato)titanium. The resulting dispersions were evaluated in the same manner as described above. As a result, the dispersions prepared by using a zirconium or titanium chelate compound also exhibited excellent stability with reduced change in viscosity with time.

Example 2

1) Preparation of Dispersion A2-1 by Solvent Replacement

Five hundred grams of dispersion A-1 of Example 1 was subjected to solvent replacement by distillation under a reduced pressure of 150 Torr while adding methyl isobutyl ketone to the dispersion at such a feed rate as to maintain the silica content of the dispersion constant. The residual isopropyl alcohol in the resulting dispersion (designated dispersion A2-1) was found to be 1.0% or less by gas chromatography. No foreign matter was observed. When diluted with methyl isobutyl ketone to a solid content of 30%, the dispersion had a viscosity of 3 mPa·s at 25° C.

2) Preparation of Dispersion B2-2 by Solvent Replacement

Five hundred grams of dispersion B-2 of Example 1 was subjected to solvent replacement by distillation under a reduced pressure of 150 Torr while adding methyl ethyl ketone to the dispersion at such a feed rate as to maintain the silica content of the dispersion constant. The residual methanol in the resulting dispersion (designated dispersion B2-2) was found to be 1.0% or less by gas chromatography. No foreign matter was observed. When diluted with methyl ethyl ketone to a solid content of 30%, the dispersion had a viscosity of 3 mPa·s at 25° C.

3) Preparation of Dispersion C2-1 by Solvent Replacement

Five hundred grams of dispersion C-1 of Example 1 was subjected to solvent replacement by distillation under a reduced pressure of 150 Torr while adding methyl isobutyl ketone to the dispersion at such a feed rate as to maintain the silica content of the dispersion constant. The residual isopropyl alcohol in the resulting dispersion (designated dispersion C2-1) was found to be 1.0% or less by gas chromatography. No foreign matter was observed. When diluted with methyl isobutyl ketone to a solid content of 20%, the dispersion had a viscosity of 2 mPa·s at 25° C.

Example 3

1) Preparation of Coating Composition for Hard Coat Layer

| | |
|---|---|
| Trimethylolpropane triacetate (Viscoat #295, from Nippon Kayaku Co., Ltd.) | 750.0 parts |
| Polyglycidyl methacrylate (weight average molecular weight: 15000) | 270.0 parts |
| Methyl ethyl ketone | 730.0 parts |
| Cyclohexanone | 500.0 parts |
| Photo polymerization initiator (Irgacure 184, from Ciba-Geigy Japan Ltd.) | 50.0 parts |

The above components were agitated in a mixing tank and filtered through a polypropylene filter having an opening size of 0.4 μm to give a coating composition for hard coat layer.

2) Preparation of Fine Titanium Dioxide Dispersion

MPT-129C, fine particles of cobalt-containing titanium dioxide particles having been surface treated with aluminum hydroxide and zirconium hydroxide, available from Ishihara Sangyo Kaisha, Ltd., was used. The particles had a $TiO_2$:$Co_3O_4$:$Al_2O_3$:$ZrO_2$ ratio of 90.5:3.0:4.0:0.5 by weight.

The titanium dioxide particles (257.1 parts) were dispersed in 701.8 parts of cyclohexanone using 41.1 parts of a dispersant shown below by use of a Dynomill to prepare a titanium dioxide dispersion having a weight average particle size of 70 nm.

Dispersant:

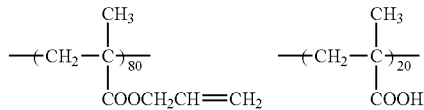

3) Preparation of Coating Composition for Middle Refractive Layer

| | |
|---|---|
| Titanium dioxide dispersion prepared in (2) above | 99.1 parts |
| Mixture of dipentaerythritol pentaacrylate and dipentaerythritol hexaacrylate (hereinafter referred to as DPHA) | 68.0 parts |
| Photo polymerization initiator (Irgacure 907, from Ciba-Geigy Japan Ltd.) | 3.6 parts |

-continued

| | |
|---|---|
| Photo sensitizer (Kayacure DETX, from Nippon Kayaku Co., Ltd.) | 1.2 parts |
| Methyl ethyl ketone | 279.6 parts |
| Cyclohexanone | 1049.0 parts |

The above components were thoroughly mixed up by agitation and filtered through a polypropylene filter having an opening size of 0.4 μm to prepare a coating composition for middle refractive layer.

4) Preparation of Coating Composition for High Refractive Layer

| | |
|---|---|
| Titanium dioxide dispersion prepared in (2) above | 469.8 parts |
| DPHA (from Nippon Kayaku Co., Ltd.) | 40 parts |
| Photo polymerization initiator (Irgacure 907, from Ciba-Geigy Japan Ltd.) | 3.3 parts |
| Photo sensitizer (Kayacure DETX, from Nippon Kayaku Co., Ltd.) | 1.1 parts |
| Methyl ethyl ketone | 526.2 parts |
| Cyclohexanone | 459.6 parts |

The above components were mixed up by agitation and filtered through a polypropylene filter having an opening size of 0.4 μm to prepare a coating composition for high refractive layer.

5) Preparation of Coating Composition A for Low Refractive Layer

| | |
|---|---|
| Fluoropolymer P-1 shown below | 74.4 parts |
| methacrylate end group-containing silicone resin X-22-164C (from Shin-Etsu Chemical Co., Ltd.) | 3 parts |
| Photo radical generator Irgacure 907 (from Ciba-Geigy Japan Ltd.) | 3 parts |
| Photo sensitizer Kayacure DETX (from Nippon Kayaku Co., Ltd.) | 1 part |
| DPHA (from Nippon Kayaku) | 18.6 parts |
| Methyl isobutyl ketone | 200 parts |

In methyl isobutyl ketone were dissolved the rest of the components listed above. The solution was diluted with methyl ethyl ketone to prepare coating composition A having a solids content of 7%.

Fluoropolymer P-1:

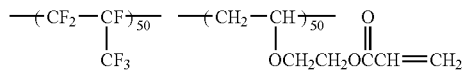

(50:50 is by mole)

Fluoropolymer P-1 was synthesized as follows. In a 100 ml autoclave equipped with a stainless steel stirrer were put 40 ml of ethyl acetate, 14.7 g of hydroxyethyl vinyl ether, and 0.55 g of dilauroyl peroxide. After the autoclave was purged with nitrogen, 25 g of hexafluoropropylene was introduced into the autoclave, followed by heating the mixture up to 65° C. The inner pressure was 5.4 kg/cm² when the temperature reached 65° C. The reaction was continued at that temperature for 8 hours. When the inner pressure dropped to 3.2 kg/cm², heating was stopped, and the reaction mixture was allowed to cool. When the inner temperature dropped to ambient temperature, the unreacted monomers were driven out, and the autoclave was opened to take out the reaction mixture, which was poured into a large excess of hexane for re-precipitation. The solvent was removed by decantation. The thus collected polymer was dissolved in a small amount of ethyl acetate and re-precipitated twice from hexane to completely remove any residual monomers. The precipitate was dried to yield 28 g of the polymer. A 20 g portion of the polymer was dissolved in 100 ml of N,N-dimethylacetamide, and 11.4 g of acryl chloride was added to the solution dropwise while cooling with ice. After the dropwise addition, the mixture was stirred at room temperature for 10 hours. Ethyl acetate was added to the reaction mixture, followed by washing with water. The organic layer was extracted and concentrated. The resulting polymer was re-precipitated with hexane to give 19 g of fluoropolymer P-1. Fluoropolymer P-1 had a refractive index of 1.421.

6) Preparation of Antireflection Film 301

The coating composition for hard coat layer was applied to a 80 μm thick cellulose triacetate base film (TD-80UF, available from Fuji Photo Film Co., Ltd.) with a gravure coater and dried at 100° C. The coating layer was irradiated with ultraviolet light at an irradiance of 400 mW/cm² and a dose of 300 mJ/cm² using a 160 W/cm air-cooled metal halide lamp (supplied by Eyegraphics Co., Ltd.) while purging with nitrogen to reduce the oxygen concentration of the atmosphere to 1.0% by volume or lower. The coating layer was thus cured to form an 8 μm thick hard coat layer.

The coating composition for middle refractive layer, the coating composition for high refractive layer, and the coating composition A for low refractive layer were continuously applied in that order onto the hard coat layer on a single web coating line having three work stations for gravure coating.

The coating film for the middle refractive layer was dried at 90° C. for 30 seconds and then cured by irradiation with ultraviolet light at an irradiance of 400 mW/cm² and a dose of 400 mJ/cm² using a 180 W/cm air-cooled metal halide lamp (from Eyegraphics Co., Ltd.) while purging with nitrogen to reduce the oxygen concentration of the atmosphere to 1.0% by volume or lower. The resulting middle refractive layer had a thickness of 67 nm and a refractive index of 1.630.

The coating film for the high refractive layer was dried at 90° C. for 30 seconds and then cured by irradiation with ultraviolet light at an irradiance of 600 mW/cm² and a dose of 400 mJ/cm² using a 240 W/cm air-cooled metal halide lamp (from Eyegraphics Co., Ltd.) while purging with nitrogen to reduce the oxygen concentration of the atmosphere to 1.0% by volume or lower. The resulting high refractive layer had a thickness of 107 nm and a refractive index of 1.905.

The coating film for the low refractive layer was dried at 90° C. for 30 seconds and then cured by irradiation with ultraviolet light at an irradiance of 600 mW/cm² and a dose of 600 mJ/cm² using a 240 W/cm air-cooled metal halide lamp (from Eyegraphics Co., Ltd.) while purging with nitrogen to reduce the oxygen concentration of the atmosphere to 1.0% by volume or lower. The resulting low refractive layer had a thickness of 85 nm and a refractive index of 1.458.

7) Preparation of Antireflection Film 302

Antireflection film 302 was prepared in the same manner as for antireflection film 301, except that the low refractive layer was formed of coating composition B described below in place of the coating composition A.

7-1) Preparation of Sol (a)

In a reactor equipped with a stirrer and a reflux condenser were put 120 parts of methyl ethyl ketone, 100 parts of M-1 (acryloyloxypropyltrimethoxysilane) (KBM-5103, from Shin-Etsu Chemical Co., Ltd.), and 3 parts of diisopropoxy (ethyl acetoacetato)aluminum and mixed up by stirring. Thirty parts of ion-exchanged water was added thereto, and the mixture was allowed to react at 60° C. for 4 hours, followed by cooling to room temperature to obtain sol (a). The weight average molecular weight of the sol particles was 1600. Hundred percent of the oligomeric and polymeric components of the product had molecular weights between 1000 and 20,000. The gas chromatography of sol (a) revealed no residue of the starting material M-1.

7-2) Preparation of Coating Composition B for Low Refractive Layer

In 200 parts of methyl isobutyl ketone were dissolved 51 parts of fluoropolymer P-1 used in coating composition A for low refractive layer, 3 parts of the methacrylate end group-containing silicone resin X-22-164C (from Shin-Etsu Chemical Co., Ltd.), 3 parts of a photo radical generator Irgacure 907 (from Ciba-Geigy Japan Ltd.), 1 part of a photo sensitizer Kayacure DETX (from Nippon Kayaku Co., Ltd.), and 13 parts of DPHA (from Nippon Kayaku). To the solution were added 22.5 parts of sol (a) prepared in (7-1) above (solid content after solvent vaporization: 9 parts) and 111 parts of dispersion A-1 prepared in Example 1 (silica solid content: 20 parts). The mixture was diluted with methyl ethyl ketone to a total solids content of 7% to obtain coating composition B.

Antireflection film 302 was prepared in the same manner as for antireflection film 301, except for using composition B to form the low refractive layer having a thickness of 85 nm.

8) Preparation of Antireflection Film 312

Antireflection film 312 was prepared in the same manner as for antireflection film 302, except for using dispersion C-1 prepared in Example 1 in place of dispersion A-1, to form the low refractive layer having a thickness of 85 nm and a refractive index of 1.44.

9) Preparation of Antireflection Film 318

Antireflection film 318 was prepared in the same manner as for antireflection film 301, except for using coating composition C prepared as follows in place of coating composition A, to form the low refractive layer having a thickness of 85 nm and a refractive index of 1.44.

Preparation of Coating Composition C for Low Refractive Layer:

In 200 parts of methyl isobutyl ketone were dissolved 44 parts of DPHA (from Nippon Kayaku Co., Ltd.), 3 parts of a methacrylate end group-containing silicone resin X-22-164C (from Shin-Etsu Chemical Co., Ltd.), 2.5 parts of a photo radical initiator Irgacure 907 (from Ciba-Geigy Japan Ltd.), and 0.5 parts of a photo sensitizer Kayacure DETX (from Nippon Kayaku). To the solution were added 45 parts of sol (a) prepared in (7-1) above (solid content after solvent vaporization: 18 parts) and 222 parts of dispersion C-1 prepared in Example 1 (silica solid content: 40 parts). The mixture was diluted with methyl ethyl ketone to a total solids content of 7% to obtain coating composition C.

10) Preparation of Antireflection Film 324

Antireflection film 324 was prepared in the same manner as for antireflection film 301, except that the low refractive layer was formed as follows.

Preparation of Coating Composition D for Low Refractive Layer

A hundred parts of Opstar JTA113 (heat crosslinking fluoropolymer in methyl ethyl ketone, available from JSR Corp.; solid content: 6%) and 3 parts of cyclohexanone were mixed to prepare coating composition D for low refractive layer.

Antireflection film 324 was prepared in the same manner as for antireflection film 301 by using coating composition D to form an 85 nm thick low refractive layer. The coating layer of coating composition D was dried at 120° C. for 12 minutes and cured by irradiation with ultraviolet light at an irradiance of 120 mW/cm$^2$ and a dose of 120 mJ/cm$^2$ using a 240 W/cm air-cooled metal halide lamp (from Eyegraphics Co., Ltd.) while purging with nitrogen to reduce the oxygen concentration of the atmosphere to 1.0% by volume or lower.

11) Preparation of Antireflection Film 325

Antireflection film 325 was prepared in the same manner as for antireflection film 324, except for using coating composition E prepared as follows to form the low refractive layer having a thickness of 85 nm.

Preparation of Coating Composition E for Low Refractive Layer:

Seventy parts of Opstar JTS113 (heat crosslinking fluoropolymer in methyl ethyl ketone, available from JSR Corp.; solid content: 6%), 9.9 parts of dispersion C-1 prepared in Example 1 (silica solid content: 1.8 parts), 2.0 parts of sol (a) (solid content: 0.81 parts), and 2.4 parts of cyclohexane were mixed up to prepare coating composition E for low refractive layer.

12) Preparation of Other Samples

Antireflection films 303 to 317, 319 to 323, and 326 to 330 were prepared in the same manner as for antireflection films 302, 318, and 325, respectively, except that the inorganic oxide dispersion of the coating composition for low refractive layer was changed as shown in Table 2 below (the main binder was not changed).

13) Evaluation of Antireflection Films

The resulting antireflection films (sample Nos. 301 through 330) were evaluated as follows.

i) Haze

A haze was compared between a sample the low refractive layer of which was formed using the coating composition immediately after the preparation and a sample the low refractive layer of which was formed using the same coating composition but after storage at 40° C. for 48 hours. Haze measurement was made with a hazemeter 1001DP supplied by Nippon Denshoku Industries Co., Ltd.

ii) Steel Wool Scratch Resistance (SW Strength)

Scratch resistance of the film was evaluated using a rubbing tester having steel wool (#0000, from Nippon Steel Wool KK) wrapped around and fixed to its friction element (1 cm by 1 cm) with a band. The friction element was placed in contact with the coated side of the film with a contact area of 1 cm by 1 cm and moved back and forth 10 times over a stroke of 13 cm at a speed of 13 cm/sec with an applied force of 500 g/cm$^2$. The measurement was carried out in an atmosphere of 25° C. and 60% RH. After the rubbing test, oily black ink was applied to the reverse side of the film, and the rubbed surface was observed with naked eye in reflected light. The scratch resistance (SW strength) was rated based on the following standard.

AA: Very careful examination reveals no scratches.

A: Very careful examination reveals barely visible scratches. No problem for practical use.

B: A shallow scratch is observed by careful examination No problem for practical use.

C: A shallow scratch is observed.

D: A scratch is observed.

E: The film has an obvious scratch.

F: The film has scratches all over its surface.

TABLE 2

| Sample No. | Main Binder | Dispersion | In-organic Oxide Particles | Compound (I) Kind | Amount* | Acid Catalyst or Metal Chelate Compound Kind | Amount* | Haze Immed. After Prepn. | Haze 48 hrs at 40° C. | SW Strength | Remark |
|---|---|---|---|---|---|---|---|---|---|---|---|
| 301 | | none | none | none | 0 | none | 0 | 0.3 | 0.3 | F | comparison |
| 302 | same as in 301 | A-1 | 45 nm silica | M-1 | 30 | di(isopropoxy)(ethyl acetoacetato)aluminum | 1.5 | 0.3 | 0.4 | AA | invention |
| 303 | same as in 301 | A-2 | 45 nm silica | " | 15 | di(isopropoxy)(ethyl acetoacetato)aluminum | 1.5 | 0.3 | 0.4 | A | invention |
| 304 | same as in 301 | A-3 | 45 nm silica | " | 5 | di(isopropoxy)(ethyl acetoacetato)aluminum | 1.5 | 0.3 | 0.5 | B | invention |
| 305 | same as in 301 | A-4 | 45 nm silica | " | 30 | none | 0.0 | 0.7 | 1 | D | comparison |
| 306 | same as in 301 | A-5 | 45 nm silica | none | 0 | none | 0.0 | 2 | 3 | F | comparison |
| 307 | same as in 301 | A-6 | 45 nm silica | M-2 | 30 | di(isopropoxy)(ethyl acetoacetato)aluminum | 1.5 | 0.3 | 0.4 | A | invention |
| 308 | same as in 301 | A-7 | 45 nm silica | M-25 | 30 | di(isopropoxy)(ethyl acetoacetato)aluminum | 1.5 | 0.3 | 0.5 | A | invention |
| 309 | same as in 301 | A-8 | 45 nm silica | M-1 | 30 | oxalic acid | 10.0 | 0.3 | 0.5 | A | invention |
| 310 | same as in 301 | A-9 | 45 nm silica | " | 30 | malonic acid | 10.0 | 0.3 | 0.5 | A | invention |
| 311 | same as in 301 | A2-1 | 45 nm silica | " | 30 | di(isopropoxy)(ethyl acetoacetato)aluminum | 1.5 | 0.3 | 0.3 | AA | invention |
| 312 | same as in 301 | C-1 | 60 nm hollow silica | M-1 | 30 | di(isopropoxy)(ethyl acetoacetato)aluminum | 1.5 | 0.3 | 0.4 | AA | invention |
| 313 | same as in 301 | C-2 | 60 nm hollow silica | " | 30 | none | 0.0 | 0.7 | 1 | D | comparison |
| 314 | same as in 301 | C-3 | 60 nm hollow silica | none | 0 | none | 0.0 | 2.5 | 3.5 | F | comparison |
| 315 | same as in 301 | C-4 | 60 nm hollow silica | M-2 | 30 | di(isopropoxy)(ethyl acetoacetato)aluminum | 1.5 | 0.3 | 0.4 | A | invention |
| 316 | same as in 301 | C-5 | 60 nm hollow silica | M-25 | 30 | di(isopropoxy)(ethyl acetoacetato)aluminum | 1.5 | 0.3 | 0.5 | A | invention |
| 317 | same as in 301 | C2-1 | 60 nm hollow silica | M-1 | 30 | di(isopropoxy)(ethyl acetoacetato)aluminum | 1.5 | 0.3 | 0.3 | AA | invention |
| 318 | | C-1 | 60 nm hollow silica | M-1 | 30 | diisopopoxy-aluminum ethyl acetate | 1.5 | 0.3 | 0.4 | AA | invention |
| 319 | same as in 318 | C-2 | 60 nm hollow silica | " | 30 | none | 0.0 | 0.6 | 1 | C | comparison |
| 320 | same as in 318 | C-3 | 60 nm hollow silica | none | 0 | none | 0.0 | 2.2 | 3.3 | E | comparison |
| 321 | same as in 318 | C-4 | 60 nm hollow silica | M-2 | 30 | di(isopropoxy)(ethyl acetoacetato)aluminum | 1.5 | 0.3 | 0.4 | AA | invention |
| 322 | same as in 318 | C-5 | 60 nm hollow silica | M-25 | 30 | di(isopropoxy)(ethyl acetoacetato)aluminum | 1.5 | 0.3 | 0.5 | A | invention |
| 323 | same as in 318 | C2-1 | 60 nm hollow silica | M-1 | 30 | di(isopropoxy)(ethyl acetoacetato)aluminum | 1.5 | 0.3 | 0.3 | AA | invention |
| 324 | | none | none | none | 0 | none | 0.0 | 0.3 | 0.3 | F | comparison |
| 325 | same as in 324 | C-1 | 60 nm hollow silica | M-1 | 30 | di(isopropoxy)(ethyl acetoacetato)aluminum | 1.5 | 0.3 | 0.4 | A | invention |
| 326 | same as in 324 | C-2 | 60 nm hollow silica | " | 30 | none | 0.0 | 0.8 | 1.5 | D | comparison |
| 327 | same as in 324 | C-3 | 60 nm hollow silica | none | 0 | none | 0.0 | 2.7 | 3.8 | F | comparison |
| 328 | same as in 324 | C-4 | 60 nm hollow silica | M-2 | 30 | di(isopropoxy)(ethyl acetoacetato)aluminum | 1.5 | 0.3 | 0.4 | A | invention |
| 329 | same as in 324 | C-5 | 60 nm hollow silica | M-25 | 30 | di(isopropoxy)(ethyl acetoacetato)aluminum | 1.5 | 0.3 | 0.4 | B | invention |

TABLE 2-continued

| Sample No. | Main Binder | Dispersion | In-organic Oxide Particles | Compound (I) Kind | Compound (I) Amount* | Acid Catalyst or Metal Chelate Compound Kind | Acid Catalyst or Metal Chelate Compound Amount* | Haze Immed. After Prepn. | Haze 48 hrs at 40° C. | SW Strength | Remark |
|---|---|---|---|---|---|---|---|---|---|---|---|
| 330 | same as in 324 | C2-1 | 60 nm hollow silica | M-1 | 30 | di(isopropoxy)(ethyl acetoacetato)aluminum | 1.5 | 0.3 | 0.3 | AA | invention |

Note:
*parts per 100 parts by weight of the inorganic oxide particle solid content The following observations are drawn from the results in Table 2. Coating layers formed by using the specific inorganic oxide dispersion of the present invention undergo little increase in haze and have improved film strength. Samples prepared using a coating composition the main binder of which is photo curable (sample Nos. 302 to 304, 307 to 312, 315 to 318, 321 to 323, 325, and 328 to 330) are excellent in film strength. Furthermore, samples 311, 317, 323, and 330, which are prepared using the coating composition containing the dispersion having been subjected to solvent replacement in Example 2 after storage, have a low haze, proving the superiority of the dispersions having been subjected to solvent replacement in stability when formulated into a coating composition.

Example 4

Antireflection films were prepared in the same manner as in Example 3, except for replacing the acrylate group as a polymerizable group of fluoropolymer P-1 used in coating composition A or B with a methacrylate group. The resulting samples were evaluated in the same manner as in Example 3. The results of evaluation were practically equal to those obtained in Example 3, except that the steel wool scratch resistance was slightly inferior.

Example 5

An 80 μm thick cellulose triacetate film (TAC-TD 80U, available from Fuji Photo Film Co., Ltd.) was immersed in a 1.5 mol/l NaOH aqueous solution at 55° C. for 2 minutes and washed with water to prepare a protective film with its both sides saponified.

Each of the antireflection films prepared in Example 3 according to the invention was treated to have its cellulose triacetate base film saponified.

The protective film and the saponified base film side of the antireflection film were stuck to each side of a polarizing film to prepare a polarizing plate. The polarizing film was prepared by impregnating a polyvinyl alcohol film with iodine followed by stretching.

The polarizing plate on the front side of a transmissive TN mode LCD monitor (having D-BEF (a polarized light separation film having a polarized light selecting layer, available from Sumitomo 3M Co., Ltd.) disposed between the backlight and the liquid crystal cell) on a notebook computer was replaced with the resulting polarizing plate with its antireflection layer side out. The thus altered LCD monitor exhibited very high display quality with markedly reduced reflection of ambient light. In particular, the antireflection films using the hollow silica particles having a refractive index of 1.31 in the low refractive layer (sample Nos. 312, 315, and 316) provided display monitors having high visibility with little reflection of ambient light.

Example 6

1) Preparation of Coating Composition for Hard Coat Layer

| | |
|---|---|
| Mixture of pentaerythritol triacrylate and pentaerythritol tetraacrylate (available from Nippon Kayaku Co., Ltd. | 50.0 g |
| Photo polymerization initiator (Irgacure 184, from Ciba Specialties Chemicals Corp.) | 2.0 g |
| Crosslinked polystyrene beads (SX-350, from Soken Chemical & Engineering Co., Ltd.; average particle size: 3.5 μm; refractive index: 1.60) in the form of a 30% toluene dispersion, used after being dispersed in a homogenizer Polytron at 10,000 rpm for 20 minutes) | 1.5 g |
| Crosslinked poly(acryl/styrene) beads (from Soken Chemical & Engineering Co., Ltd.; average particle size: 3.5 μm; refractive index: 1.55) in the form of a 30% toluene dispersion, used after being dispersed in Polytron at 10,000 rpm for 20 minutes) | 13.9 g |
| Fluorine-containing surface modifier (FP-132) shown below: 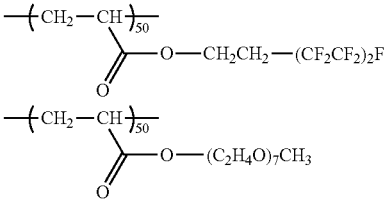 | 0.75 g |
| Acryloyloxypropyltrimethoxysilane (KBM-5103, from Shin-Etsu Chemical Co., Ltd.) | 10.0 g |
| Toluene | 38.5 g |

The above components were mixed up and filtered through a polypropylene filter having an opening size of 30 μm to give a coating composition for hard coat layer.

2) Preparation of Multilayer Antireflection Film

A 80 μm thick cellulose triacetate base film (TAC-TD80U from Fuji Photo Film) was continuously fed at a speed of 30 m/min, coated with the above-prepared coating composition for hard coat layer by means of a combination of a microgravure roll and a doctor blade. The microgravure roll had a diameter of 50 mm and a gravure pattern of 180 lines/inch with a cell depth of 40 μm and was rotated at a speed of 30 rpm. The applied coating layer was dried at 60° C. for 150 seconds and cured by irradiation with UV light at an irradiance of 400 mW/cm$^2$ and a dose of 250 mJ/cm$^2$ using a 160 W/cm air-cooled metal halide lamp (supplied by Eyegraphics Co., Ltd.) while purging with nitrogen to reduce the oxygen concentration of the atmosphere to 1.0% by volume or lower. The coating layer was thus cured to form a 6 μm thick hard coat layer. The coated film was taken up. The hard coat layer had a center-line average roughness Ra of 0.18 µm, a ten point height Rz of 1.40 µm, and a haze of 0.35%.

A low refractive layer was formed on the hard coat layer using each of the formulations used in Examples 3 and 4, and the resulting antireflective film was evaluated in the same manner as in Example 3. The results showed that the antireflection films according to the present invention have high steel wool scratch resistance.

Example 7

Antireflection films were prepared in the same manner as in Examples 3 and 6, except that a slot die coating technique was used in place of the gravure coating. As a result, it was confirmed that the antireflection films of the present invention exhibit excellent coating surface conditions and high scratch resistance as well as low refractive indices.

Example 8

Each of the antireflection films prepared in Examples 3 and 6 in accordance with the present invention was stuck to the front side of an organic ELD via a pressure sensitive adhesive. The display exhibited excellent visibility with suppressed reflection on its glass face plate.

Example 9

Stabilization of Inorganic Oxide Particles

1) Preparation of Dispersion a-1

Thirty parts of tridecafluorooctyltrimethoxysilane (A-1) and 1.5 parts of di(isopropoxy)(ethyl acetoacetate)aluminum were mixed into 333 parts of silica sol (silica sol in isopropyl alcohol, IPA-ST-L, available from Nissan Chemical Industries, Ltd.; average particle size: 45 nm; silica concentration: 30%), and 9 parts of ion exchanged water was added thereto. The mixture was allowed to react at 60° C. for 8 hours, followed by cooling to room temperature. To the mixture was added 1.8 parts of acetylacetone to give dispersion a-1.

2) Preparation of Dispersion b-1

Thirty parts of heptadecafluorodecyltrimethoxysilane (A-3) (TSL-8233, available from GE Toshiba Silicones) and 1.5 parts of di(isopropoxy)(ethyl acetoacetato)aluminum were mixed into 333 parts of silica sol (Methanol Silica Sol, from Nissan Chemical; average particle size: 12 nm; silica concentration: 30%), and 9 parts of ion exchanged water was added thereto. The mixture was allowed to react at 60° C. for 8 hours, followed by cooling to room temperature. To the reaction mixture was added 1.8 parts of acetylacetone to obtain dispersion b-1.

3) Preparation of Dispersion c-1

Thirty parts of tridecafluorooctyltrimethoxysilane (A-1) and 1.5 parts of di(isopropoxy)(ethyl acetoacetato)aluminum were mixed into 500 parts of hollow silica sol (hollow silica sol in isopropyl alcohol, CS-60-IPA, available from Catalysts & Chemicals Industries Co., Ltd.; average particle size: 60 nm; shell thickness: 10 nm; silica concentration: 20%; refractive index: 1.31), and 9 parts of ion exchanged water was added thereto. The mixture was allowed to react at 60° C. for 8 hours, followed by cooling to room temperature. To the mixture was added 1.8 parts of acetylacetone to give dispersion c-1.

4) Preparation of Dispersion d-1

Thirty parts of heptadecafluorodecyltrimethoxysilane (A-3) and 1.5 parts of di(isopropoxy)(ethyl acetoacetato)aluminum were mixed into 333 parts of zirconium oxide sol in methyl ethyl ketone (available from Sumitomo Osaka Cement Co., Ltd.; average particle size: 10 nm; zirconium oxide concentration: 30%), and 9 parts of ion exchanged water was added thereto. The mixture was allowed to react at 60° C. for 8 hours, followed by cooling to room temperature. To the mixture was added 1.8 parts of acetylacetone to give dispersion d-1.

5) Preparation of Other Dispersions

Dispersions a-2 through 4, b-2 through 4, C-2 through 4, and d-2 through 4 were prepared in the same manner as for dispersions a-1, b-1, c-1, and d-1, respectively, except for changing the fluorine-containing action system as shown in Table 3 below.

Each of the resulting dispersions was evaluated as follows immediately after the preparation and after storage at 40° C. for 2 weeks. The results obtained are shown in Table 3.

i) Generation of Foreign Matter

A 10 ml portion of the dispersion was put into a 10 mm diameter test tube, inspected for any foreign matter with the naked eye, and rated as follows.

A: No foreign matter is observed.

B: Foreign matter of about 50 µm is slightly observed.

C: Foreign matter greater than 500 µm is obviously observed.

D: Foreign matter greater than 500 µm and an aggregated precipitate are obviously observed.

ii) Change in Viscosity

The viscosity of the dispersion was measured with a vibration type viscometer CJV5000 (available from A & D Co., Ltd.) at 25° C.

TABLE 3

| Dispersion | Inorganic Oxide Particles | Compound (I) | | Compound (II) | | Foreign Matter | | Viscosity (mPa·s) | | Remark |
| | | Kind | Amount* | Kind | Amount* | Immed. after Prepn. | 2 wk at 40° C. | Immed. after Prepn. | 2 wk at 40° C. | |
|---|---|---|---|---|---|---|---|---|---|---|
| a-1 | 45 nm silica | A-1 | 30 | — | 0 | A | A | 7 | 9 | invention |
| a-2 | " | A-1 | 30 | M-1 | 30 | A | A | 7 | 10 | invention |
| a-3 | " | A-1 | 30 | M-2 | 60 | A | A | 7 | 10 | invention |
| a-4 | " | — | 0 | — | 0 | D | D | 15 | 30 | comparison |
| b-1 | 12 nm silica | A-3 | 30 | — | 0 | A | A | 7 | 9 | invention |
| b-2 | " | A-3 | 30 | M-2 | 30 | A | A | 7 | 11 | invention |
| b-3 | " | A-1 | 30 | M-2 | 60 | A | A | 7 | 10 | invention |
| b-4 | " | — | 0 | — | 0 | D | C | 15 | 30 | comparison |
| c-1 | 60 nm hollow silica | A-1 | 30 | — | 0 | A | A | 7 | 9 | invention |
| c-2 | 60 nm hollow silica | A-1 | 30 | M-1 | 30 | A | A | 7 | 10 | invention |

TABLE 3-continued

| Dispersion | Inorganic Oxide Particles | Compound (1) Kind | Compound (1) Amount* | Compound (II) Kind | Compound (II) Amount* | Foreign Matter Immed. after Prepn. | Foreign Matter 2 wk at 40° C. | Viscosity (mPa·s) Immed. after Prepn. | Viscosity (mPa·s) 2 wk at 40° C. | Remark |
|---|---|---|---|---|---|---|---|---|---|---|
| c-3 | 60 nm hollow silica | A-1 | 30 | M-2 | 60 | A | A | 7 | 10 | invention |
| c-4 | 60 nm hollow silica | — | 0 | — | 0 | D | D | 15 | 35 | comparison |
| d-1 | 10 nm zirconia | A-3 | 30 | — | 0 | A | A | 4 | 6 | invention |
| d-2 | 10 nm zirconia | A-3 | 30 | M-1 | 30 | A | A | 4 | 6 | invention |
| d-3 | 10 nm zirconia | A-1 | 30 | M-1 | 60 | A | A | 4 | 6 | invention |
| d-4 | 10 nm zirconia | — | 0 | — | 0 | D | D | 7 | 25 | comparison |

Note:
*part per 100 parts by weight of the inorganic oxide particle solid content The following observations are drawn from the results in Table 3. The dispersions of inorganic oxide particles having been treated using the fluorine-containing silane coupling agent of formula (1) and/or the organosilane compound of formula (II) in the presence of the metal chelate compound suffer from less foreign matter generation immediately after the preparation and even after storage in high temperature and less increase in viscosity even when stored at 40° C. for two weeks, proving to be stable.

Example 10

1) Preparation of Sol (b)

Sol (b) was prepared in the same manner as for sol (a) of Example 3, except that the reaction time was reduced to 2 hours.

2) Preparation of Sol (c)

Sol (c) was prepared in the same manner as for sol (b), except for replacing 100 parts of M-1 with 40 parts of A-1 (TSL-8257 from GE Toshiba Silicone) and 60 parts of M-1.

3) Preparation of Dispersion c-5

Thirty parts of M-1 and 1.5 parts of di(isopropoxy)(ethyl acetoacetato)aluminum were mixed into 500 parts of hollow silica sol in isopropyl alcohol (CS-60-IPA, from Catalysts & Chemicals Industries Co., Ltd.; average particle size: 60 nm; shell thickness: 10 nm; silica concentration: 20%; refractive index: 1.31), and 9 parts of ion exchanged water was added thereto. The mixture was allowed to react at 60° C. for 8 hours, followed by cooling to room temperature. To the mixture was added 1.8 parts of acetylacetone to give dispersion c-5.

4) Preparation of Dispersion c-6

Ten parts of A-1 and 1.5 parts of di(isopropoxy)(ethyl acetoacetato)aluminum were mixed into 500 parts of hollow silica sol in isopropyl alcohol (CS-60-IPA, from Catalysts & Chemicals Industries Co., Ltd.; average particle size: 60 nm; shell thickness: 10 nm; silica concentration: 20%; refractive index: 1.31), and 9 parts of ion exchanged water was added thereto. The mixture was allowed to react at 60° C. for 4 hours. Thirty parts of M-1 was added to the reaction mixture, and the reaction was further continued for an additional 4 hour period, followed by cooling to room temperature. To the mixture was added 1.8 parts of acetylacetone to obtain dispersion c-6.

5) Preparation of Dispersion c-7

Fifteen parts of M-1 and 1.5 parts of di(isopropoxy)(ethyl acetoacetato)aluminum were mixed into 500 parts of hollow silica sol in isopropyl alcohol (CS-60-IPA, from Catalysts & Chemicals Industries Co., Ltd.; average particle size: 60 nm; shell thickness: 10 nm; silica concentration: 20%; refractive index: 1.31), and 9 parts of ion exchanged water was added thereto. The mixture was allowed to react at 60° C. for 4 hours. Sixty-three parts of sol (c) prepared in (2) above was added to the reaction mixture, and the reaction was further continued for an additional 4 hour period, followed by cooling to room temperature. To the mixture was added 1.8 parts of acetylacetone to give dispersion c-7.

6) Preparation of Dispersion c-8

Ten parts of A-1 and 1.5 parts of di(isopropoxy)(ethyl acetoacetato)aluminum were mixed into 500 parts of hollow silica sol in isopropyl alcohol (CS-60-IPA, from Catalysts & Chemicals Industries Co., Ltd.; average particle size: 60 nm; shell thickness: 10 nm; silica concentration: 20%; refractive index: 1.31), and 9 parts of ion exchanged water was added thereto. The mixture was allowed to react at 60° C. for 4 hours. Seventy-five parts of sol (b) prepared in (1) above was added to the reaction mixture, and the reaction was further continued for an additional 4 hour period, followed by cooling to room temperature. To the mixture was added 1.8 parts of acetylacetone to give dispersion c-8.

7) Preparation of Dispersion c-9

Ten parts of A-1, 30 parts of M-1, and 1.5 parts of di(isopropoxy)(ethyl acetoacetato)aluminum were mixed into 500 parts of hollow silica sol in isopropyl alcohol (CS-60-IPA, from Catalysts & Chemicals Industries Co., Ltd.; average particle size: 60 nm; shell thickness: 10 nm; silica concentration: 20%; refractive index: 1.31), and 9 parts of ion exchanged water was added thereto. The mixture was allowed to react at 60° C. for 8 hours, followed by cooling to room temperature. To the mixture was added 1.8 parts of acetylacetone to give dispersion c-9.

8) Preparation of Dispersion 2Blank by Solvent Replacement

Five hundred grams of untreated hollow silica sol in isopropyl alcohol (CS-60-IPA, from Catalysts & Chemicals Industries Co., Ltd.; average particle size: 60 nm; shell thickness: 10 nm; silica concentration: 20%; refractive index: 1.31) was subjected to solvent replacement by distillation under a reduced pressure of 39 hPa while adding cyclohexanone to the dispersion at such a feed rate as to maintain the silica content of the dispersion constant. No foreign matter was observed in the resulting dispersion. When diluted with methyl isobutyl ketone to a solid content of 20%, the dispersion had a viscosity of 3 mPa·s at 25° C. The residual isopropyl alcohol in the dispersion was found to be 0.5% or less by gas chromatography.

9) Preparation of Dispersion 2c-1 by Solvent Replacement

Five hundred grams of dispersion c-1 prepared in Example 9 was subjected to solvent replacement in the same manner as in (8) above to obtain dispersion 2c-1. The viscosity of dispersion 2c-1 was 12 mPa·s at 25° C.

10) Preparation of Dispersion 2c-2 by Solvent Replacement

Five hundred grams of dispersion c-2 prepared in Example 9 was subjected to solvent replacement in the same manner as in (8) above to obtain dispersion 2c-2. The viscosity of dispersion 2c-2 was 13 mPa·s at 25° C.

11) Preparation of Dispersion 2c-3 by Solvent Replacement

Five hundred grams of dispersion c-3 prepared in Example 9 was subjected to solvent replacement in the same manner as in (8) above to obtain dispersion 2c-3. The viscosity of dispersion 2c-3 was 13 mPa·s at 25° C.

12) Preparation of Dispersion 2c-5 by Solvent Replacement

Five hundred grams of dispersion c-5 prepared in (3) above was subjected to solvent replacement in the same manner as in (8) above to obtain dispersion 2c-5. The viscosity of dispersion 2c-5 was 15 mPa·s at 25° C.

13) Preparation of Dispersions 2c-6 to 2c-9 by Solvent Replacement

Solvent replacement was carried out in the same manner as in (8) above, except for replacing CS-60-IPA with each of dispersions c-6 to c-9, to obtain dispersions c2-6 to c2-9.

Example 11

1) Preparation of Antireflection Film 1101

An antireflection film 1101 was prepared in the same manner as for sample 301 of Example 3, except that coating composition F prepared as described blow was used in place of coating composition A to form the low refractive layer and that curing of coating composition F by UV irradiation was carried out in an atmosphere with an oxygen concentration of 0.05% by volume or lower.

Preparation of Coating Composition F for Low Refractive Layer

| | |
|---|---|
| Fluoropolymer P-3 | 75.2 parts |
| methacrylate end group-containing silicone resin RMS-033 (from Gelest Inc.) | 3 parts |
| Photo radical initiator Irgacure 907 (from Ciba-Geigy Japan Ltd.) | 3 parts |
| DPHA (from Nippon Kayaku) | 18.8 parts |
| 2-Butanone | 200 parts |
| Cyclohexanone | 150 parts |

In a mixture of 2-butanone and cyclohexanone were dissolved the rest of the components listed above. The solution was diluted with methyl ethyl ketone to prepare a coating composition F having a solids content of 7%.

The cured low refractive layer had a thickness of 85 nm and a refractive index of 1.458.

2) Preparation of Antireflection Film 1102

Antireflection film 1102 was prepared in the same manner as for antireflection film 1101, except that the low refractive layer was formed of coating composition G described below in place of the coating composition F.

Preparation of Coating Composition G for Low Refractive Layer

In a mixed solvent of 200 parts of 2-butanone and 150 parts of cyclohexanone were dissolved 30 parts of the fluoropolymer P-3, 3 parts of the methacrylate end group-containing silicone resin RMS-033 (from Gelest Inc.), 3 parts of a photo radical generator Irgacure 907 (from Ciba-Geigy Japan Ltd.), and 7 parts of DPHA (from Nippon Kayaku Co., Ltd.). To the solution were added 18 parts of sol (a) prepared in Example 3 and 150 parts of dispersion 2 blank prepared in Example 10 (silica solid content: 30 parts). The mixture was diluted with methyl ethyl ketone to a total solids content of 7% to obtain coating composition G.

The low refractive layer (thickness: 85 nm) of antireflection film 1102 had a refractive index of 1.435.

3) Preparation of Other Samples 1103 to 1107

Antireflection films 1103 through 1106 were prepared in the same manner as for antireflection film 1102, except that the kind of the inorganic oxide dispersion and the amount of sol (a) in the coating composition for low refractive layer were changed as shown in Table 4 below (the main binder was not changed). All the films 1103 to 1106 had a refractive index of about 1.435.

Antireflection film 1107 was prepared in the same manner as antireflection film 1105, except for replacing the fluoropolymer P-3 with DPHA. The refractive index of antireflection film 1107 as 1.44.

4) Evaluation of Antireflection Films

The resulting antireflection films (sample Nos. 1101 through 1107) were evaluated as follows. The results obtained are shown in Table 4.

i) Surface Condition

Oily black ink was applied to the reverse side of the antireflection film, and the surface side of the film was inspected with the naked eye at various angles about 10 cm below a 500 W 3-wave fluorescent lamp. Unevenness looking like white haze due to reflected light scattering was rated as follows.
A: No haze is seen even with a very careful examination.
B: A very careful examination reveals slight light scattering.
C: A whitish haze is partly observed.
D: A whitish haze is observed all over the surface.

ii) Steel Wool Scratch Resistance (SW Strength)

Scratch resistance of the film was evaluated in the same manner as in Example 3.

TABLE 4

| Sample No. | Dispersion No. | Sol (a) (part*) | Surface Condition | SW Strength | Remark |
|---|---|---|---|---|---|
| 1101 | — | — | A | F | comparison |
| 1102 | 2blank | 18 | D | F | comparison |
| 1103 | 2c-1 | 12 | B | AA | invention |
| 1104 | 2c-2 | 6 | A | AA | invention |
| 1105 | 2c-3 | 0 | A | AA | invention |
| 1106 | 2c-5 | 12 | C | A | invention |
| 1107 | 2c-3 | 0 | B | A | invention |

The results in Table 4 prove that the coating film formed by using the surface-treated hollow silica dispersion according to the present invention is excellent in surface condition and SW strength.

5) Antireflection films 1108 to 1111 were prepared in the same manner as for antireflection film 1102, except that the inorganic oxide dispersion of coating composition G was changed as shown in Table 5 below and that sol (a) was not used in the coating composition (the main binder was not changed). The amount of the tridecafluorooctyltrimethoxysilane (A-1) and/or acryloyloxypropyltrimethoxysilane (M-1) that were present from the start of the reaction in the preparation of the inorganic oxide dispersion and the amount of A-1 and/or M-1 that were added in the course of the reaction are also shown in Table 5. The resulting films were evaluated in the same manner as described above. The results obtained are shown in Table 5.

TABLE 5

| Sample No. | Dispersion No. | Initial Amount | | Added Amount | | Surface Condition | SW Strength | Remark |
|---|---|---|---|---|---|---|---|---|
| | | A-1 | M-1 | A-1 | M-1 | | | |
| 1108 | 2c-6 | 10 | — | — | 30 | B | AA | invention |
| 1109 | 2c-7 | — | 15 | 10* | 15* | A | AA | invention |
| 1110 | 2c-8 | 20 | — | — | 30** | A | A | invention |
| 1111 | 2c-9 | 20 | 30 | — | — | B | A | invention |

Note:
*The amount of A-1 or M-1 used in the preparation of sol (c) added in the course of the reaction.
**The amount of M-1 used in the preparation of sol (b) added in the course of the reaction.

On comparing samples using the same amount of the fluorine-containing silane coupling agent A-1 and the same amount of the organosilane compound M-1, it can be seen that adding M-1 or sol (b) (i.e., sol of M-1) in the course of the reaction as in samples 1108 and 1110, respectively, tends to result in improved surface condition and improved SW strength. It is additionally seen that addition of sol (c) (i.e., sol of A-1 and M-1) in the course of the reaction as in Sample 1109 also tends to result in improvements in surface condition and SW strength.

Example 12

Antireflection films were prepared in the same manner as in Example 11, except that the acrylate group as a polymerizable group of the fluoropolymer (P-3) used in coating compositions F and G for low refractive layer was replaced with a methacrylate group. The resulting antireflection films were evaluated in the same manner as in Example 11 to give practically the same results as in Example 11, except that the SW strength was slightly deteriorated.

Example 13

An 80 μm thick cellulose triacetate film (TAC-TD 80U, available from Fuji Photo Film Co., Ltd.) was immersed in a 1.5 mol/l NaOH aqueous solution at 55° C. for 2 minutes and washed with water to prepare a protective film with its both sides saponified.

Each of the antireflection films prepared in Example 11 according to the invention was treated to have its cellulose triacetate base film saponified.

The protective film and the saponified base film side of the antireflection film were stuck to each side of a polarizing film to prepare a polarizing plate. The polarizing film was prepared by impregnating a polyvinyl alcohol film with iodine followed by stretching.

The polarizing plate on the front side of a transmissive TN mode LCD monitor (having D-BEF (a polarized light separation film having a polarized light selecting layer, available from Sumitomo 3M Co., Ltd.) disposed between the backlight and the liquid crystal cell) on a notebook computer was displaced with the resulting polarizing plate with its antireflection layer side out. The thus altered LCD monitor exhibited very high display quality with markedly reduced reflection of ambient light. In particular, the antireflection films using hollow silica particles having a refractive index of 1.31 in the low refractive layer provided display monitors having high visibility with little reflection of ambient light.

Example 14

1) Preparation of Coating Composition for Hard Coat Layer

| | |
|---|---|
| Mixture of pentaerythritol triacrylate and pentaerythritol tetraacrylate (Kayarad PET-30, available from Nippon Kayaku Co., Ltd.) | 50.0 g |
| Photo polymerization initiator (Irgacure 184, from Ciba Specialties Chemicals Corp.) | 2.0 g |
| Crosslinked polystyrene beads (SX-350, from Soken Chemical & Engineering Co., Ltd.; average particle size: 3.5 μm; refractive index: 1.60) in the form of a 30% toluene dispersion, used after being dispersed in a homogenizer Polytron at 10,000 rpm for 20 minutes) | 1.5 g |
| Crosslinked poly(acryl/styrene) beads (from Soken Chemical & Engineering Co., Ltd.; average particle size: 3.5 μm; refractive index: 1.55) in the form of a 30% toluene dispersion, used after being dispersed in Polytron at 10,000 rpm for 20minutes) | 13.9 g |
| Fluorine-containing surface modifier (FP-132) shown below: 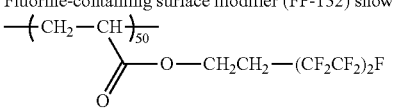 | 0.75 g |
| Acryloyloxypropyltrimethoxysilane (KBM-5103, from Shin-Etsu Chemical Co., Ltd.) | 10.0 g |
| Toluene | 38.5 g |

The above components were mixed up and filtered through a polypropylene filter having an opening size of 30 μm to give a coating composition for hard coat layer.

2) Preparation of Multilayer Antireflection Film

A 80 μm thick cellulose triacetate base film (TAC-TD80U from Fuji Photo Film) was continuously fed at a speed of 30 m/min, coated with the coating composition for hard coat layer by means of a combination of a microgravure roll and a doctor blade. The microgravure roll had a diameter of 50 mm and a gravure pattern of 180 lines/inch with a cell depth of 40 μm and was rotated at a speed of 30 rpm. The applied coating layer was dried at 60° C. for 150 seconds and cured by irradiation with UV light at an irradiance of 400 mW/cm² and a dose of 250 mJ/cm² using a 160 W/cm air-cooled metal halide lamp (supplied by Eyegraphics Co., Ltd.) while purging with nitrogen to reduce the oxygen concentration of the atmosphere to 1.0% by volume or lower. The coating layer was thus cured to form a 6 μm thick hard coat layer. The hard coat layer had a center-line average roughness Ra of 0.18 μm, a ten point height Rz of 1.40 μm, and a haze of 35%.

A low refractive layer was formed on the hard coat layer using each of the formulations used in Examples 11 and 12, and the resulting antireflective film was evaluated in the same manner as in Example 11. The results showed that the antireflection films according to the invention have an excellent surface condition and high steel wool scratch resistance.

Example 15

1) Preparation of Coating Composition for Hard Coat Layer
The components shown below were agitated in a mixing tank to prepare a coating composition for hard coat layer.

| | |
|---|---|
| Zirconia-containing UV curing resin composition (DeSolite, from JSR Corp.) | 100 parts |
| DPHA (from Nippon Kayaku Co., Ltd.) | 31 parts |
| Silane coupling agent (KBM-5103, from Shin-Etsu Chemical Co., Ltd.) | 10 parts |
| Silica particles (KE-P150, from Nippon Shokubai Co., Ltd.; average particle size: 1.5 μm) | 8.9 parts |
| Crosslinked polymethyl methacrylate particles (MXS-300, from Soken Chemical & Engineering Co., Ltd.; average particle size: 3 μm) | 3.4 parts |
| Methyl ethyl ketone | 29 parts |
| Methyl isobutyl ketone | 13 parts |

2) Preparation of Multilayer Antireflection Film
A 80 μm thick cellulose triacetate base film (TAC-TD80U from Fuji Photo Film) was continuously fed at a speed of 10 m/min, coated with the coating composition for hard coat layer by means of a combination of a microgravure roll and a doctor blade. The microgravure roll had a diameter of 50 mm and a gravure pattern of 135 lines/inch with a cell depth of 60 μm. The applied coating layer was dried at 60° C. for 150 seconds and cured by irradiation with UV light at an irradiance of 400 mW/cm² and a dose of 250 mJ/cm² using a 160 W/cm air-cooled metal halide lamp (supplied by Eyegraphics Co., Ltd.) while purging the atmosphere with nitrogen and taken up. The rotating speed of the microgravure roll was adjusted so as to give a cured hard coat layer of 3.6 μm. The hard coat layer had a center-line average roughness Ra of 0.04 μm, an Rq (the equivalent or RMS) of 0.06 μm, a ten point height Rz of 0.27 μm as measured with a scanning probe microscope system SPI3800 supplied by Seiko Instruments Inc.

A low refractive layer was formed on the hard coat layer using each of coating compositions F and G prepared in Example 11, and the resulting antireflective films were evaluated in the same manner as in Example 11. The results showed that the antireflection films according to the invention have an excellent surface condition and high steel wool scratch resistance.

Example 16

Antireflection films were prepared and evaluated in the same manner as in Examples 11 and 15, except that a slot die coating system was used in place of the microgravure coating system. The resulting films of the present invention have an excellent surface condition, a low refractive index, and high scratch resistance.

Example 17

Each of the antireflection films prepared in Examples 11 and 15 according to the present invention was stuck to the front glass of an organic ELD via a pressure-sensitive adhesive. The display exhibited excellent visibility with suppressed reflection on the glass surface.

This application is based on Japanese Patent application JP 2004-340106, filed Nov. 25, 2004, Japanese Patent application JP 2003-434144, filed Dec. 26, 2003, and Japanese Patent application JP 2004-90450, filed Mar. 25, 2004, the entire contents of those are hereby incorporated by reference, the same as if set forth at length.

What is claimed is:

1. A coating process comprising:
   producing a dispersion of inorganic oxide particles dispersed in an organic solvent by a process comprising:
   (1) surface treating inorganic oxide particles with at least one of a hydrolyzate and a partial condensate of an organosilane compound represented by formula (I):

$$(R^{10})_m\text{—Si}(X)_{4-m} \tag{I}$$

wherein $R^{10}$ represents a substituted or unsubstituted alkyl group or a substituted or unsubstituted aryl group; X represents a hydroxyl group or a hydrolyzable group; and
   m represents an integer of 1 to 3,
   in an organic solvent comprising 30% by volume or less of ketone solvent in a presence of at least one of (a) an acid catalyst and (b) a metal chelate compound having Zr, Ti or Al as a center metal and at least one of an alcohol represented by formula: $R^3OH$ in which $R^3$ represents an alkyl group having 1 to 10 carbon atoms, and a compound represented by formula: $R^4COCH_2COR^5$ in which $R^4$ represents an alkyl group having 1 to 10 carbon atoms; and $R^5$ represents an alkyl group having 1 to 10 carbon atoms or an alkoxy group having 1 to 10 carbon atoms, as a ligand, and
   (2) replacing the organic solvent used for the surface treatment with an organic solvent comprising 50% by volume or more of ketone solvent;
   preparing a coating composition comprising a film-forming composition comprising a compound having an ethylenically unsaturated group and the dispersion of inorganic oxide particles dispersed in an organic solvent; and
   applying the coating composition;
   wherein the inorganic oxide particles are hollow silica particles.

2. The coating process according to claim 1, wherein the compound having an ethylenically unsaturated group is a main component of the film forming composition.

3. The coating process according to claim 1, wherein the coating composition contains a fluoropolymer represented by formula (A):

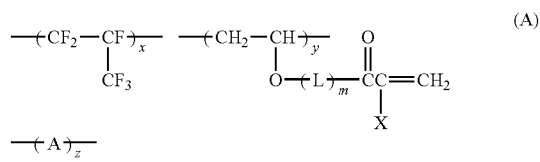

wherein L represents a linking group having 1 to 10 carbon atoms; m represents 0 or 1; X represents a hydrogen atom or a methyl group; A represents a repeating unit derived from at least one vinyl monomer; and x, y, and z represent a mole percent of respective repeating units in ranges $30 \leq x \leq 60$, $5 \leq y \leq 70$, and $0 \leq z 65$.

4. The coating process according to claim 1, wherein the inorganic oxide particles are surface treated with (i) the at least one of a hydrolyzate and a partial condensate of the organosilane compound represented by formula (I), and (ii) a compound having at least one of a fluoroalkyl group and a fluorine-containing aromatic group.

5. The coating process according to claim 4, wherein at least one of the organosilane compound represented by formula (I) and the compound having at least one of a fluoroalkyl group and a fluorine-containing aromatic group is a fluorine-containing silane coupling agent represented by formula (1):

$$(Rf\text{-}L_1)_n\text{-}Si(R^{11})_{n-4} \tag{1}$$

wherein Rf represents a straight-chain, branched or cyclic fluoroalkyl group having 1 to 20 carbon atoms or a fluorine-containing aromatic group having 6 to 14 carbon atoms; $L_1$ represents a divalent linking group having 10 or fewer carbon atoms; $R_{11}$ represents a hydroxyl group or a hydrolyzable group; and n represents an integer of 1 to 3.

6. The coating process according to claim 5, wherein the fluorine-containing silane coupling agent is represented by formula (2):

$$C_nF_{2n+1}\text{—}(CH_2)_m\text{—}Si(R)_3 \tag{2}$$

wherein n represents an integer of 1 to 10; m represents an integer 1 to 5; and R represents an alkoxy group having 1 to 5 carbon atoms or a halogen atom.

7. The coating process according to claim 1, wherein the organosilane compound of formula (I) is represented by formula (II):

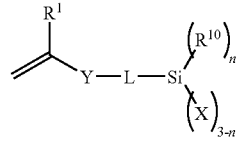

(II)

wherein $R^{10}$ represents a substituted or unsubstituted alkyl group or a substituted or unsubstituted aryl group; X represents a hydroxyl group or a hydrolyzable group; $R^1$ represents a hydrogen atom, a methyl group, a methoxy group, an alkoxycarbonyl group, a cyano group, a fluorine atom or a chlorine atom; Y represents a single bond, —COO—, —CONH— or —O—; L represents a divalent linking group; and n represents 0 or 1.

* * * * *